(12) United States Patent
Hiller et al.

(10) Patent No.: US 6,985,333 B1
(45) Date of Patent: Jan. 10, 2006

(54) LOAD/UNLOAD-TYPE DISK DRIVE SLIDER HAVING A NEGATIVE PRESSURE REDUCTION HOLE

(75) Inventors: Bernhard Hiller, San Jose, CA (US); Erhard Schreck, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 264 days.

(21) Appl. No.: 10/252,297

(22) Filed: Sep. 23, 2002

Related U.S. Application Data
(60) Provisional application No. 60/326,932, filed on Oct. 4, 2001.

(51) Int. Cl.
*G11B 5/60* (2006.01)
*G11B 5/54* (2006.01)

(52) U.S. Cl. .................. 360/235.5; 360/254.2; 360/234.6; 360/245.1

(58) Field of Classification Search .......... 360/234.6, 360/234.3, 235.4, 235.5, 236.3, 244.2, 244.9, 360/245, 245.1, 245.3, 254.7
See application file for complete search history.

(56) References Cited

U.S. PATENT DOCUMENTS

| | | | | |
|---|---|---|---|---|
| 3,488,648 A | | 1/1970 | Church .................. 340/174.1 |
| 4,814,906 A | * | 3/1989 | Suzuki et al. ................ 360/75 |
| 4,975,795 A | * | 12/1990 | Spash ..................... 360/245.8 |
| 5,136,438 A | * | 8/1992 | Wakatsuki et al. ........... 360/69 |
| 5,276,573 A | | 1/1994 | Harada et al. .............. 360/103 |
| 6,301,080 B1 | | 10/2001 | Boutaghou .................. 360/255 |
| 6,344,949 B1 | * | 2/2002 | Albrecht et al. .......... 360/236.5 |
| 6,445,541 B1 | | 9/2002 | Boutaghou et al. ...... 360/235.5 |
| 6,590,746 B2 | * | 7/2003 | Kang et al. .............. 360/236.3 |
| 2002/0126418 A1 | * | 9/2002 | Ueno et al. .............. 360/235.7 |
| 2004/0104722 A1 | * | 6/2004 | Kainuma et al. .......... 324/210 |

FOREIGN PATENT DOCUMENTS

| | | | | |
|---|---|---|---|---|
| JP | 63-96783 A | * | 4/1988 |
| JP | 63-224087 A | * | 9/1988 |
| JP | 1-149211 A | * | 6/1989 |
| JP | 5-69256 A | * | 3/1993 |
| JP | 2000-123515 A | * | 4/2000 |

* cited by examiner

*Primary Examiner*—Jefferson Evans
(74) *Attorney, Agent, or Firm*—Marsh Fischmann & Breyfogle LLP

(57) ABSTRACT

The present invention generally relates to a disk drive and methods for operating the same. A venting assembly of this disk drive generally includes a slider having an air bearing surface system for generating positive pressure to urge the slider away from a data storage disk, and a suction cavity for generating negative pressure to urge the slider toward the surface of the disk. The slider of the venting assembly also generally includes a first venting hole extending through the slider within the suction cavity. A first valve of the venting assembly is generally associated with the first venting hole to at least assist in controlling airflow through the same. Contact between a load beam of the venting assembly and a corresponding load/unload ramp of the disk drive during unloading of the slider generally tends to open the first valve and substantially dissipate the negative pressure within the suction cavity.

63 Claims, 13 Drawing Sheets

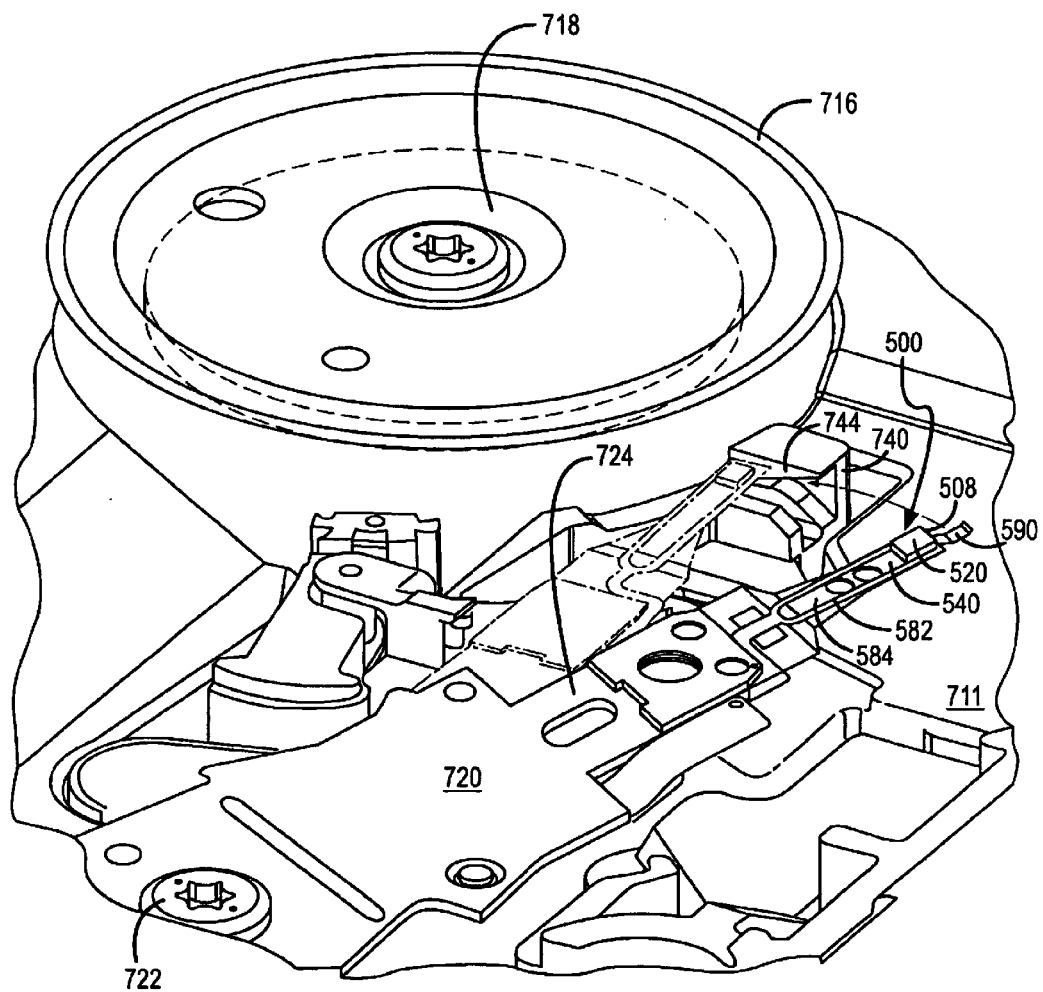
FIG.11A

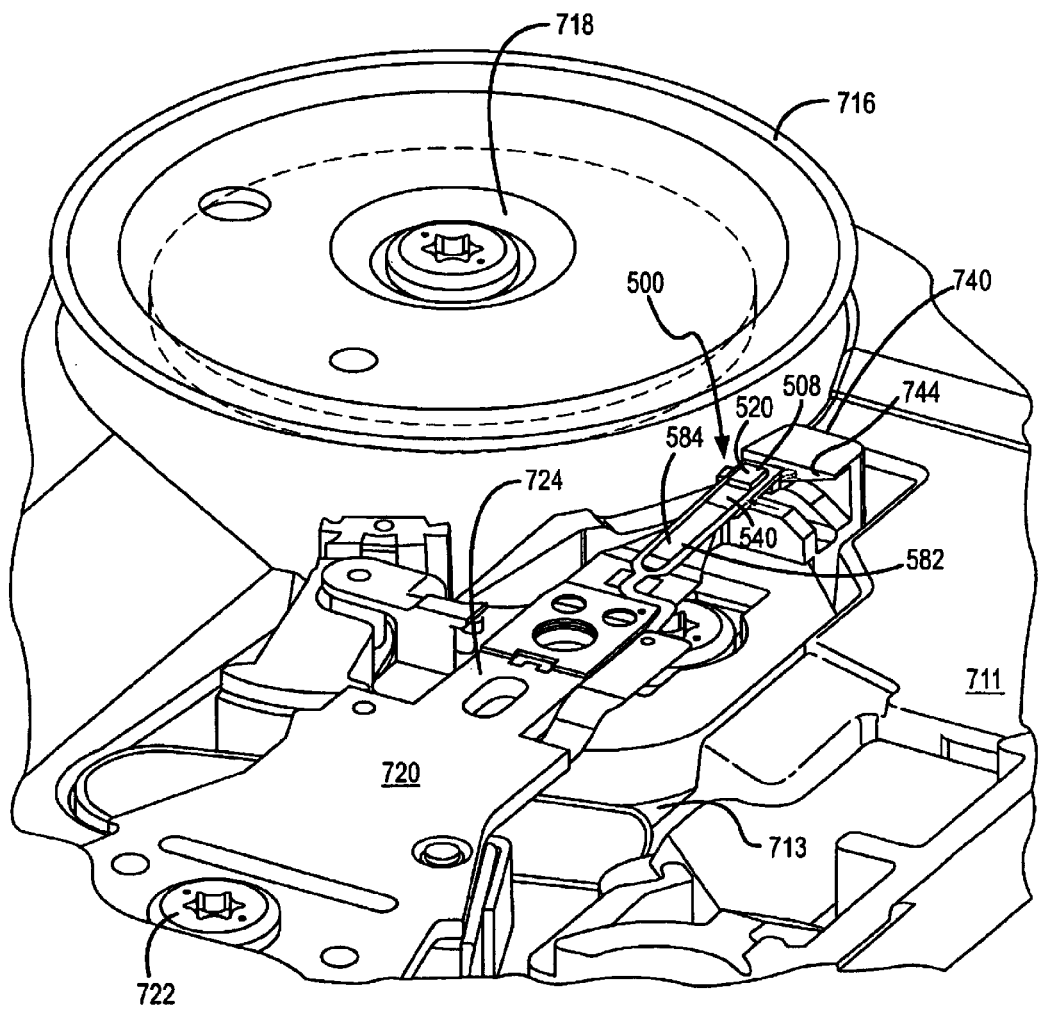
FIG.11B
710

LOAD/UNLOAD-TYPE DISK DRIVE SLIDER HAVING A NEGATIVE PRESSURE REDUCTION HOLE

RELATED APPLICATION

This application claims priority under 35 USC 119(e) to U.S. Provisional Application No. 60/326,932 entitled "Slider Pressuring Hole," filed on Oct. 4, 2001, and which is incorporated herein by reference in its entirety herein.

FIELD OF THE INVENTION

The present invention generally relates to load/unload-type disk drives and, more particularly, to a slider of a load/unload-type disk drive that includes at least one venting hole to reduce the negative pressure of the suction cavity during disk drive operations, and in particular, during unloading of the slider out of operative relation with a corresponding data storage disk surface.

BACKGROUND OF THE INVENTION

A common disk drive design generally includes at least one data storage disk (e.g., magnetic) with concentric data tracks, an air bearing slider for each data storage surface of each data storage disk that includes a read/write head for reading and writing data on the various data tracks on the corresponding data storage surface, an actuator arm assembly (generally including a rigid actuator arm or tip and a suspension) for holding the slider over the corresponding data storage surface, and a voice coil motor for moving the actuator arm assembly, and hence the head(s), across the corresponding data storage surface to the desired data track and holding the head over the relevant data track during a read or write operation. The air bearing slider generally flies above its corresponding data storage surface during disk drive operations on a boundary layer of air that is carried by the rotating data storage disk and that is appropriately compressed by the slider.

Disk drives increasingly reflect a need to improve the density at which information can be recorded on and reliably read from a data storage medium, e.g., a disk. The recording density of a disk drive is effectively limited by at least two factors: 1) the distance between the slider and the data storage medium during read/write operations; and 2) the wasted radial distance of the data storage surface the slider must travel during loading/unloading processes. A goal of most flying-type slider designs is to operate a slider as closely as possible to a data storage medium during normal disk drive operations, while avoiding physical impact with the data storage medium. In slider air bearing designs, a minimal amount of clearance (fly height) of the slider relative to the data storage medium is preferred so that, for example, the head can distinguish between magnetic fields emanating from adjacently spaced tracks on the data storage medium. Accordingly, most recent slider designs have implemented complimentary positive pressure-producing components (e.g., air bearing surfaces) and negative pressure producing components (e.g., a suction cavity) to minimize and control the fly height of the slider. During normal reading/writing operations, the negative pressure producing components of the slider generally tend to beneficially urge the slider toward the data storage surface to keep the fly height at a minimum. However, in unloading a slider out of operational interface with a spinning data storage medium, the negative pressure can be a hindrance that requires a significant amount of radial distance to be dissolved. Unfortunately, the radial distance of the disk surface the slider travels while the negative pressure component(s) is being dissolved generally cannot be utilized to store data. This wasted radial distance (generally known in the art as a "footprint") of the data storage medium may result in wasting up to about 8% or more of the potential data storage surface of the disk.

A variety of disk drive and slider designs have been proposed and implemented to more quickly dissolve the negative pressure associated with wasted disk space (or "footprint") during unload operations of load/unload-type disk drives. Specifically, the suction cavity has been positioned more toward the trailing edge of the slider. However, such a development enables the leading edge of the slider to increase its pitch during unloading which may result in slider flight instability and damage/wear to the corresponding data storage surface. Additionally, "leading edge limiters" have been utilized in an attempt to more quickly dissolve negative pressure associated with the slider. These leading edge limiters are generally attached to the load beam and tend to engage the flexure of the load beam if the slider does not unload from operative interface with the data storage surface easily. Essentially, these leading edge limiters function to jerk the slider away from the data storage surface. However, control of such leading edge limiters has been difficult to achieve (with an ideal gap being about 30 microns having an ideal tolerance of about±10 microns, and the actual achieved gap being closer to about 65 microns having an actual tolerance undesirably closer to about±25 microns). Further, various attempts have been made to tightly control the pitch static attitude and roll static attitude of a slider, but no significant advances have been made. Notwithstanding these efforts, it would be desirable to develop a slider design which reduces the radial data storage space wasted during unloading operations of a load/unload/type disk drive.

SUMMARY OF THE INVENTION

A first aspect of the present invention is embodied in a disk drive having a data storage disk, a slider body, and a first valve. Generally, the data storage medium of the disk drive moves relative to the slider body in a direction at least generally from a leading edge of the slider body toward a trailing edge of the slider body. The slider body also has an upper surface and a lower surface that projects toward the data storage medium of the disk drive. Generally, the slider body includes at least one air bearing surface for generating positive pressure to urge the slider body away from the surface of the data storage disk, and at least one suction cavity for generating negative pressure to urge the slider body toward the surface of the data storage disk. The slider body also has a first venting hole extending through the slider body within the suction cavity. The first valve of the disk drive of this first aspect is generally associated with this first venting hole.

Various refinements exist regarding the features noted in relation to the subject first aspect of the present invention. Other features may also be incorporated in the subject first aspect of the present invention as well. These refinements and additional features may exist individually or in any combination. For instance, the first venting hole may extend from the upper surface to the lower surface of the slider body. In other words, the first venting hole may span the entire thickness of the slider body. In one embodiment, this first venting hole may exhibit a diameter of less than about 1.0 mm. That is, a cross-sectional view of the first venting hole taken along a plane substantially parallel with the upper surface of the slider body may exhibit an opening measuring less than about 1.0 mm across. In another embodiment, this first venting hole has a diameter ranging from about 0.1 mm up to about 0.3 mm. However, yet another embodiment of the first aspect may include the first venting hole having a diameter ranging from about ⅓ to about ⅔ of the thickness of the slider body at the location of the first venting hole. As stated above, the thickness of the slider body generally corresponds with a distance between the upper surface and the lower surface of the slider body. Diameters of the first venting hole outside the disclosed ranges may also be appropriate. In addition, while cylindrical and/or frustoconical configurations are generally preferred for the first venting hole, other configurations capable of providing venting between the lower and upper surfaces of the slider body may be appropriate. In some embodiments of this first aspect, a lower opening of the first venting hole defined by the lower surface of the slider body is generally unobstructed and completely exposed to the air bearing being carried by the data storage medium. However, other embodiments may exhibit a variety of slider components positioned at/near the lower opening of the first venting hole.

In the case of the first aspect of the present invention, the suction cavity may generally be positioned between at least one air bearing surface and the trailing edge of the slider body. However, the suction cavity may be positioned between at least one air bearing surface and the leading edge of the slider body. One embodiment of the subject first aspect may include first and second air bearing surfaces. In such an embodiment, the suction cavity may generally be positioned between the first and second air bearing surfaces. This first air bearing surface may be one or both longitudinally and laterally spaced from the second air bearing surface. Generally, the suction cavity may be used with any appropriate arrangement of one or more ABS pads.

Regardless of placement of the suction cavity (cavities), the first valve associated with the first venting hole of this first aspect may generally be positioned over one of the ends of the first venting hole and disposed either toward the upper or lower surface of the slider body. Typically the first valve will be located on that side of the slider body having the upper surface to reduce the effects of the existence of the first valve on the flight characteristics of the slider body. In one embodiment, this first valve at least generally assists in controlling (i.e., facilitating and/or preventing) airflow through the first venting hole and is generally movable between at least first and second positions. In the first position, the first valve may at least substantially seal the first venting hole or otherwise provide a barrier to an airflow through the first vent hole for normal disk drive operations. In other words, the first valve may at least in effect occlude the first venting hole to in effect at least substantially prevent airflow from passing entirely through the first venting hole when in the first position (i.e., closed position). Moreover, the first or closed position of the first valve in one embodiment of the first aspect may, for example, generally be characterized by the bottom surface of the first valve contacting a periphery of the first venting hole defined by the upper surface of the slider body. However, in another embodiment of the first aspect, the first or closed position of the first valve may generally result in at least substantially blocking airflow through the first venting hole. That is, the first venting hole may generally be sealed, and thus prevent or at least significantly reduce airflow from entering one end of the first venting hole and exiting another end of the first venting hole. Various examples of appropriate structures capable of being utilized as the first valve may include, but are not limited to, a plate-like gasket that may be disposed over one end of the first venting hole, an annular gasket or O-ring of sorts that may be disposed about the first venting hole, or even an intrusive structure (e.g., a conical structure) that is disposed within the first venting hole (e.g., like a needle valve).

Conversely, in the second position, the first valve may generally be spaced from the first venting hole or otherwise position so as to allow an airflow into the suction cavity having the first venting hole. This is utilized for "parking" of the slider body at the end of normal disk drive operations. That is, the first valve may exhibit an "open" configuration enabling the passage of airflow entirely through the first venting hole when in the second position. So for example, in one embodiment, a bottom surface of the first valve may be spaced from the upper surface of the slider body when the first valve is in an open position. Stated another way, an orientation of the first valve may generally enable the passage of airflow entirely through the first venting hole when in the open position. As another example, the bottom surface of the first valve of one embodiment may generally be spaced from the upper surface of the slider body by a distance of about 1.0 mil (25.4 $\mu$m) when the first valve is in the open position. Yet other embodiments may exhibit other appropriate spacings between the first valve and the upper surface of the slider body.

This first valve, in the case of this first aspect of the present invention, may have a variety of designs and configurations. In one embodiment, the first valve may be part of a valve assembly that also includes a first flexure apparatus. In such an embodiment, this first flexure apparatus of the valve assembly may be attached to a load beam of the disk drive, and the slider body may be mounted on the first flexure apparatus. In other words, the valve assembly may provide an interconnection of sorts between the load beam and the slider body of the disk drive. The valve assembly of this first aspect may generally move up and down along with the associated load beam during normal disk drive operations since the valve assembly is generally attached to/interconnected with the load beam. This load beam may generally interface with a load/unload ramp of the disk drive to impose a lifting force on the load beam during unloading. In one embodiment of the subject first aspect, the load beam may have a lift tab that is generally capable of interfacing with the corresponding load/unload ramp of the disk drive to impose a lifting force on the load beam during unloading. So, when parking the slider (i.e., withdrawing the slider from operational interface with the corresponding data storage disk of the disk drive), the load beam may be forced away from its corresponding data storage disk by engaging the load/unload ramp of the disk drive. The valve assembly may or may not initially move with the load beam upon the load beam engaging the load/unload ramp. In other words, a spacing between the valve assembly and the load beam may increase upon the load beam engaging the load/unload ramp. Stated yet another way, negative pressure within the suction cavity of the slider body may resist movement of the slider body away from the disk. However, this increase in spacing between the load beam and the valve assembly, at least in one embodiment, generally removes or at least significantly reduces a bias of the load beam on the first valve of the valve assembly. Accordingly, the first valve may exhibit an "open" configuration, wherein the first valve is positioned to enable airflow through the first venting hole to in turn dissolve the negative pressure within the suction cavity of the slider body.

The first valve of the valve assembly may have a first thickness, and the first flexure apparatus of the valve assembly may have a second thickness greater than or less than the first thickness. So for example, the first thickness of the first valve may be about 20 μm while the second thickness of the first flexure apparatus may be greater than 20 μm. However, other embodiments may include first valves having other appropriate first thicknesses. The first valve may have a modulus elasticity of about 200 GPa ($2.0 \times 10^{11}$ N/m$^2$), although other moduli of elasticity may be appropriate. Regardless, the first flexure apparatus can be made from any appropriate material including (but not limited to) stainless steel, thermoplastics, aluminum (including aluminum alloys, titanium (including titanium alloys, and combinations thereof. In some embodiments, the first valve may have a length of about 0.4 mm. In other embodiments, the first valve can include a first length of up to about 40% of a body length of the slider body. The "body length" of the slider body generally refers to a distance between the leading and trailing edges of the slider body. In yet other embodiments, other lengths of the first valve may be appropriate. The first valve of this first aspect may be configured to have a shaft and a head. In one embodiment, this shaft may be narrower than the corresponding head. The shaft of the first valve may have a width of about 0.2 mm. In some embodiments, the shaft of the first valve may have a width of up to about 30% of a body width of the slider body, wherein the body width of the slider body generally refers to a distance between first and second sides of the slider body.

In the case of the first aspect of the present invention, a first gasket may be positioned on a bottom surface of the first valve generally to closed off or at least substantially occlude the first venting hole when the first valve is in the closed position. So, for example, the first gasket of the first valve of one embodiment may generally interface with the periphery of the first venting hole when the first valve is in the closed position. In one embodiment, the first gasket may have a first diameter, and the corresponding first venting hole may have a second diameter less than the first diameter. In other words, the first gasket may generally be designed and configured to entirely cover the opening of the first venting hole (at least when in a closed position). This first gasket may exhibit a variety of appropriate designs such as, but not limited to, a three-dimensional solid structure (e.g., a conical, cylindrical, box-shaped structure) or a ring-shaped structure. In addition, the first gasket may be made from any appropriate gasket material including (but not limited to) polyimid, thermoplastics, elastomers, rubber, and combinations thereof. Examples of appropriate thermoplastics (amorphous, crystalline, or otherwise) may include Nylon®, polypropylene, and acetal. Examples of appropriate elastomers may include thermoplastic polyurethane (TPU), thermoplastic elastomer polyolefin (TPO), and flexible polyvinyl chloride (PVC). Examples of appropriate rubbers (synthetic or otherwise) may include nitrile rubber, and ethylene propylene terpolymer (EPDM) rubber.

In embodiments of the subject first aspect of the present invention that include a load beam, the load beam generally includes a top surface and a corresponding bottom surface that generally faces the data storage medium of the disk drive. In one embodiment, the first valve is positioned between the load beam and the slider body. The load beam may be equipped with a protrusion which can interface with the slider body and/or the first valve to bias the slider body toward the data storage medium. In an operating position of the disk drive, this protrusion of the load beam may be positioned against the first valve such that the first valve substantially seals the upper opening of the venting hole. In other words, the protrusion of the load beam may be biased against the first valve of the slider body while, for example, the slider body is exchanging magnetic data with the corresponding data storage medium (e.g., during normal disk drive operations). Conversely, in an unloading position of the disk drive, the protrusion of the load beam may generally be spaced from the first valve and/or the slider body such that an air flow passage exists between an upper opening of the venting hole and the first valve. That is, the protrusion of the load beam may be separated from the first valve and/or the slider body at least at some point during taking the slider body out of operational interface with the corresponding data storage medium (i.e., during unloading).

The first flexure apparatus of the valve assembly in the case of this first aspect may be made of any appropriate material (e.g., stainless steel) and may be affixed to the slider body using adhesive or any other appropriate fastener. The first valve of the first aspect may generally include an attachment end defined by where the first valve is connected to the first flexure apparatus of the valve assembly. Generally, the first valve of the valve assembly may be configured as a cantilever of sorts. Accordingly, except for the attachment end, the first valve may generally be spaced/separated from (i.e., avoid contact with) a remainder of the valve assembly. In some embodiments of the subject first aspect that exhibit this first flexure apparatus being positioned between the bottom surface of the load beam and the upper surface of the slider body, the load beam may include a leading edge limiter that is generally equipped with a flange to engage and lift a lip of the valve assembly during unloading. So, for example, when the load beam of one embodiment engages the load/unload ramp of the disk drive, the leading edge limiter may contact the valve assembly and limit the amount of spacing between the load beam and the valve assembly (i.e., essentially "jerking" the valve assembly and attached slider body away from the corresponding data storage disk).

While this subject first aspect of the present invention has been discussed generally with respect to a first venting hole, a first valve, some embodiments do reflect the slider body having a plurality of venting holes and the first valve being a plurality of valves. These embodiments may exhibit configurations in which the number of valves may be equal to the number of venting holes. Other ones of these embodiments may exhibit configurations in which at least one valve interfaces with more than one venting hole. Multiple suction cavities may also be provided on the lower service of the slider body, and one or more venting holes and one or more battles may be associated with each suction cavity in this case. In addition, various features discussed in relation to one or more of the following aspects of the present invention may be incorporated into this subject first aspect of the present invention as well, and in any appropriate manner noted herein.

Second, third, fourth, and fifth aspects of the present invention are all generally embodied by a method of operating a disk drive. In each of the second, third, fourth, and fifth aspects, a slider is generally flown relative to a data storage disk. This "flying" of the slider generally includes generating a negative pressure within a first region that acts on a first portion of the slider and generating a positive pressure that acts on a second portion of the slider. Each of the respective methods also includes (at least at some point) parking the slider in spaced relation to its corresponding data storage disk (e.g., when termination of normal disk drive operations is desired/required).

With regard to the second aspect of the present invention, the "parking" of the slider generally includes relieving the negative pressure within the first region in no more than about 1 μs of starting the parking step. The start of this parking step of this second aspect is generally initiated by having an appropriate structure (e.g., a portion of the load beam that is interconnected with the slider) engage the load/unload ramp or the like of the disk drive. Accordingly, negative pressure within the first region of the slider is generally relieved within about 1 μs of the appropriate structure engaging the load/unload ramp of the disk drive of this second aspect. Various refinements exist regarding the features noted in relation to this subject second aspect of the present invention. Other features may also be incorporated in the subject second aspect of the present invention as well. These refinements and additional features may exist individually or in any combination. For instance, the parking step may include interconnecting a slider with a load beam, and contacting the load beam against a load/unload ramp of the disk drive. The parking step may include directing an airflow through a first vent formed in the slider and the first region of the slider. In some embodiments, the negative pressure generated with the first region of the slider is increased by no more than about 1% (and even more preferably no more than about 0%) at any point during the parking step. This negative pressure may have an absolute value of about 40 kPa (0.39 atm or 5.80 psi) up to about 50 kPa (0.49 atm or 7.25 psi) prior to the parking step; however, negative pressures outside this range may be appropriate.

Some embodiments of this subject second aspect may include an additional step of exchanging magnetic information with data tracks of the data storage disk at least within a range of about 0 mils up to about 3 mils from a peripheral edge of potential data storage area of the data storage disk. Other embodiments may include exchanging magnetic information with data tracks of the data storage disk outside the range of about 0 mils up to about 3 mils from a peripheral edge of the potential data storage area of the data storage disk.

With regard to the third aspect of the present invention, the parking step generally includes directing an airflow through a first vent formed in the slider toward the first region of the slider to address the negative pressure. Various refinements exist regarding the features noted in relation to this subject third aspect of the present invention. Other features may also be incorporated in the subject third aspect of the present invention as well. These refinements and additional features may exist individually or in any combination. For instance, the directing step of the parking step can include dissolving the negative pressure within the first region of the slider. In other words, the negative pressure that biases the slider toward the disk may be dissipated during the directing step. In some embodiments, this negative pressure may be substantially relieved in no more than about 1 μs of starting the parking step. This parking step may be associated with contacting a load beam of the disk drive against a load/unload ramp of the disk drive.

The fourth aspect of the present invention includes a step of exchanging magnetic information with data tracks of the data storage disk at least within a range of about 0 mils up to about 3 mils from a peripheral edge of potential data storage area of the data storage disk. In other words, read and/or write functions are generally accomplished within about 3 mils from the peripheral edge(s) of the data storage area. This is possible by being able to quickly dissipate the negative pressure in the various manners described herein, although such are not required by the basic parameters of the fourth aspect.

The fifth aspect of the present invention has a parking step that includes contacting a load beam of the disk drive with a load/unload ramp of the disk drive. The negative pressure substantially dissipates upon the load beam contacting the load/unload ramp. In addition, the negative pressure generally increases by no more than about 1% at any point during this parking step.

Various features discussed above in relation to one or more of the aspects of the present invention may be incorporated into any of the other aspects of the present invention as well, and in any manner noted above.

BRIEF DESCRIPTION OF THE DRAWINGS

FIGS. 11A–B are perspective views of the disk drive of FIG. 10, illustrating the actuator arm assembly prior to and after interfacing with a load/unload ramp of the disk drive.

DETAILED DESCRIPTION

Figure 1:
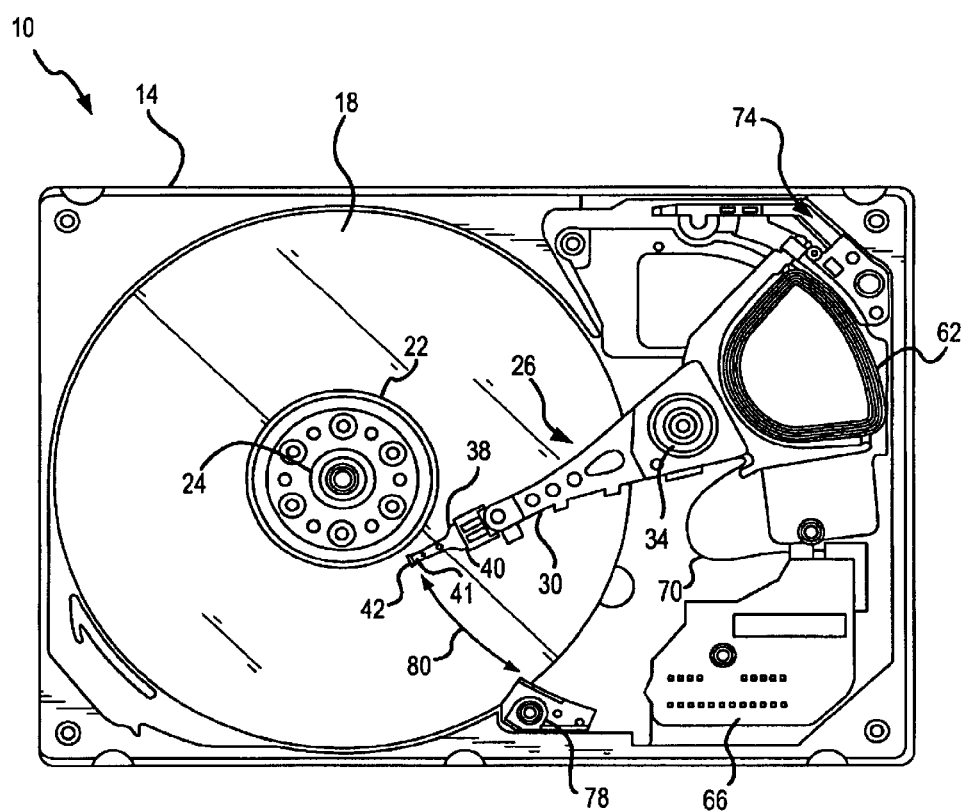
FIG. 1 is a top view of one embodiment of a disk drive.

The present invention will now be described in relation to the accompanying drawings which at least assist in illustrating its various pertinent features. The invention generally includes a slider that has at least one air bearing surface for generating positive pressure to urge the slider away from a surface of a data storage disk, and a suction cavity for generating negative pressure to urge the slider toward the surface of the data storage disk. Both are utilized to control the fly height of the slider. The slider also generally includes a first venting hole extending through the entirety of the slider body (generally oriented so that one end of this first venting hole may be found within the suction cavity of the slider body) and a first valve associated with the first venting hole. Prior to discussing this desired suction cavity venting feature, certain basic principles of disk drives will be addressed. One embodiment of a disk drive 10 is illustrated in FIG. 1. The disk drive 10 generally includes a base plate 14 and a cover (not shown) that may be disposed on the base plate 14 to define an enclosed housing or space for the various disk drive components. The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub or spindle 22, which in turn is rotatably interconnected with the disk drive base plate 14 and/or cover. Multiple data storage disks 18 may be mounted in vertically spaced and generally parallel relation on the spindle 22. Rotation of the disk(s) 18 is provided by a spindle motor 24 that is coupled to the spindle 22 to simultaneously spin the data storage disk(s) 18 at an appropriate rate.

The disk drive 10 also includes an actuator arm assembly 26 that pivots about a pivot bearing 34, which in turn is rotatably supported by the base plate 14 and/or cover. The actuator arm assembly 26 includes one or more individual rigid actuator arms 30 that extend out from near the pivot bearing 34. Multiple actuator arms 30 would be disposed in vertically spaced relation, with one actuator arm 30 typically being provided for each major data storage surface of each data storage disk 18 of the disk drive 10. Other types of actuator arm assembly configurations could be utilized as well, such as an "E" block having one or more rigid actuator arm tips (or the like) that cantilever from a common structure. In any case, movement of the actuator arm assembly 26 is provided by an actuator arm drive assembly, such as a voice coil motor 62 or the like. The voice coil motor 62 is a magnetic assembly that controls the operation of the actuator arm assembly 26 under the direction of control electronics 66. Other actuator arm assembly drive types may be appropriate for use by the disk drive 10, such as a linear drive (for the case where the actuator arm assembly 26 is interconnected with the base plate 14 and/or cover for linear movement versus the illustrated pivoting movement about the pivot bearing 34) and other types of rotational drives.

A load beam or suspension 38 is attached to the free end of each actuator arm 30 or actuator arm tip, and cantilevers therefrom. Typically the suspension 38 is biased at least generally toward its corresponding disk 18 by a spring-like force. A slider 42 is disposed at or near the free end of each suspension 38. What is commonly referred to as the "head" (e.g., at least one transducer) is appropriately mounted on the slider 42 and is used in disk drive read/write operations. Various types of read/write technologies may be utilized by the head on the slider 42. The biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head is interconnected with the control electronics 66 of the disk drive 10 by a flex cable 70 that is typically mounted on the actuator arm assembly 26. Signals are exchanged between the head on the slider 42 and its corresponding data storage disk 18 for disk drive read and/or write operations. In this regard, the voice coil motor 62 pivots the actuator arm assembly 26 to simultaneously move each head on its slider 42 along a path 80 and "across" the corresponding data storage disk 18 to position the head at the desired/required radial position on the disk 18 (i.e., at the correct track on the data storage disk 18) for disk drive read/write operations.

When the disk drive 10 is not in operation, the actuator arm assembly 26 is pivoted to a "parked position" to dispose each slider 42 typically at least generally at or beyond a perimeter of its corresponding data storage disk 18 or at a more interiorly disposed location, but in any case in vertically spaced relation to its corresponding disk 18. This is commonly referred to in the art as being a dynamic load/unload disk drive configuration. In this regard, the disk drive 10 includes a ramp assembly 78 that is generally disposed beyond a perimeter of the data storage disk 18 to typically both move the corresponding slider 42 vertically away from its corresponding data storage disk 18 and to also exert somewhat of a retaining force on the actuator arm assembly 26. Any configuration for the ramp assembly 78 that provides the desired "parking" function may be utilized. In some instances, it may be desirable to at least attempt to retain the actuator arm assembly 30 in this parked position if the disk drive 10 is exposed to a shock event. In this regard, the disk drive 10 may include an actuator arm assembly latch 74 that moves from a non-latching position to a latching position to engage the actuator arm assembly 26 so as to preclude the same from pivoting in a direction which would tend to drag the slider(s) 42 across the corresponding data storage disk(s) 18.

Figure 2:
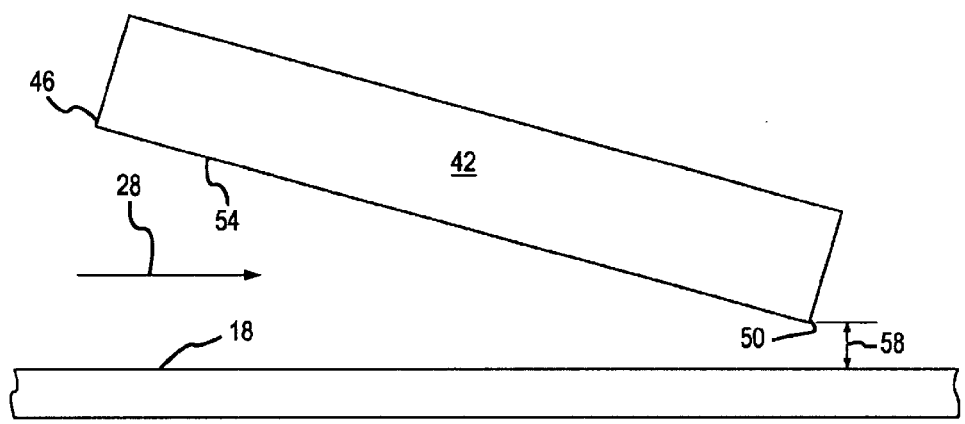
FIG. 2 is an enlarged schematic (in side view) of a flying-type slider that may be used by the disk drive of FIG. 1 and during normal disk drive operations.

The slider 42 of the disk drive 10 is generally configured to "fly" on an air bearing during rotation of its corresponding data storage 18 at a sufficient velocity. This is schematically illustrated in FIG. 2. Here the direction of the rotation of the disk 18 relative to the slider 42 is represented by arrow 28, while the fly height of the slider 42 is represented by reference numeral 58 (measured from a reference plane of the mean of the surface roughness of the disk 18). In FIG. 2, the slider 42 is disposed at a pitch angle such that its leading edge 46 of the slider 42 is disposed further from its corresponding data storage disk 18 than its trailing edge 50. The transducer (not shown) is typically incorporated on the slider 42 at least generally toward its trailing edge 50 since the trailing edge 50 is positioned closest to its corresponding data storage disk 18. Other pitch angles could be utilized for flying the slider 42.

Figure 3A:
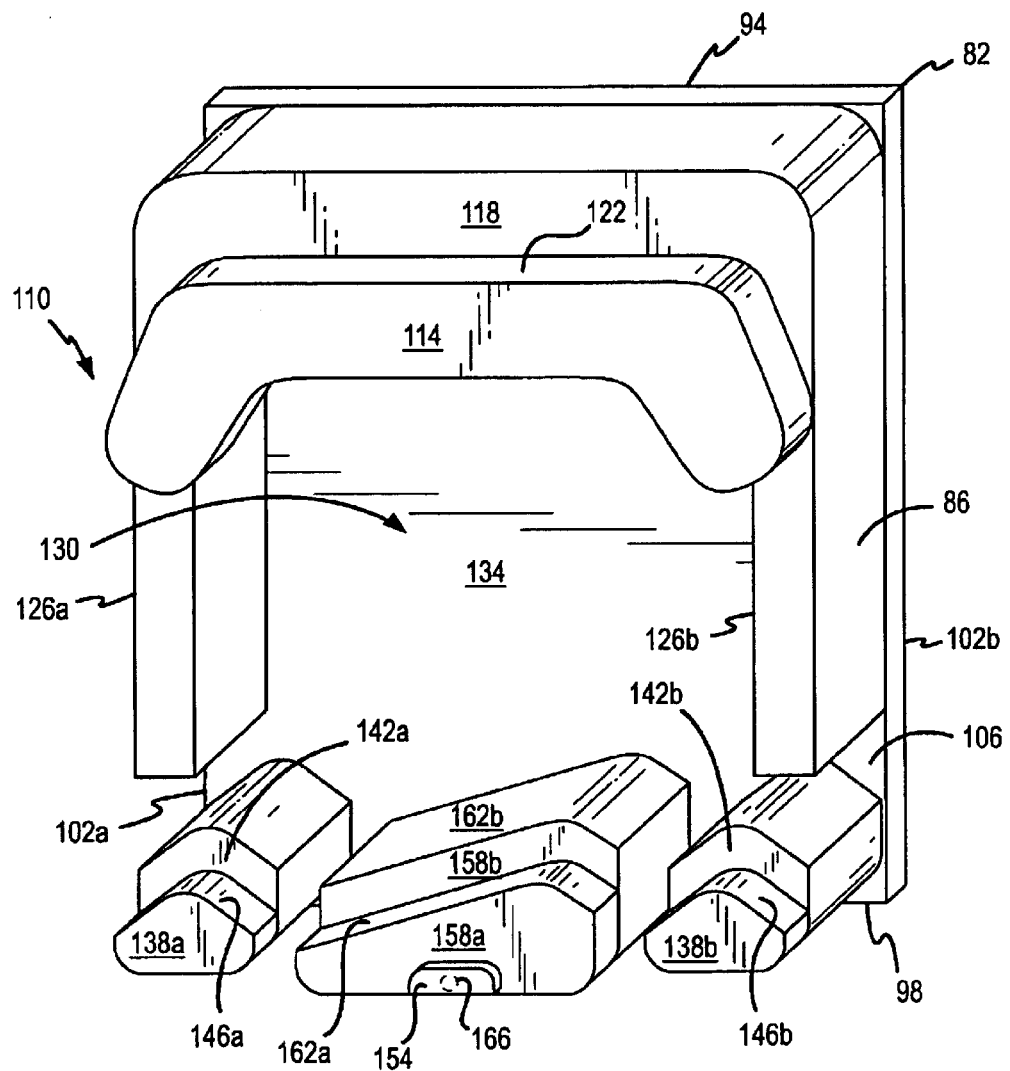
FIG. 3A is a perspective view of one embodiment of a flying-type slider that may be utilized by the disk drive of FIG. 1, and illustrating a plurality of air bearing surfaces.
Figure 3B:
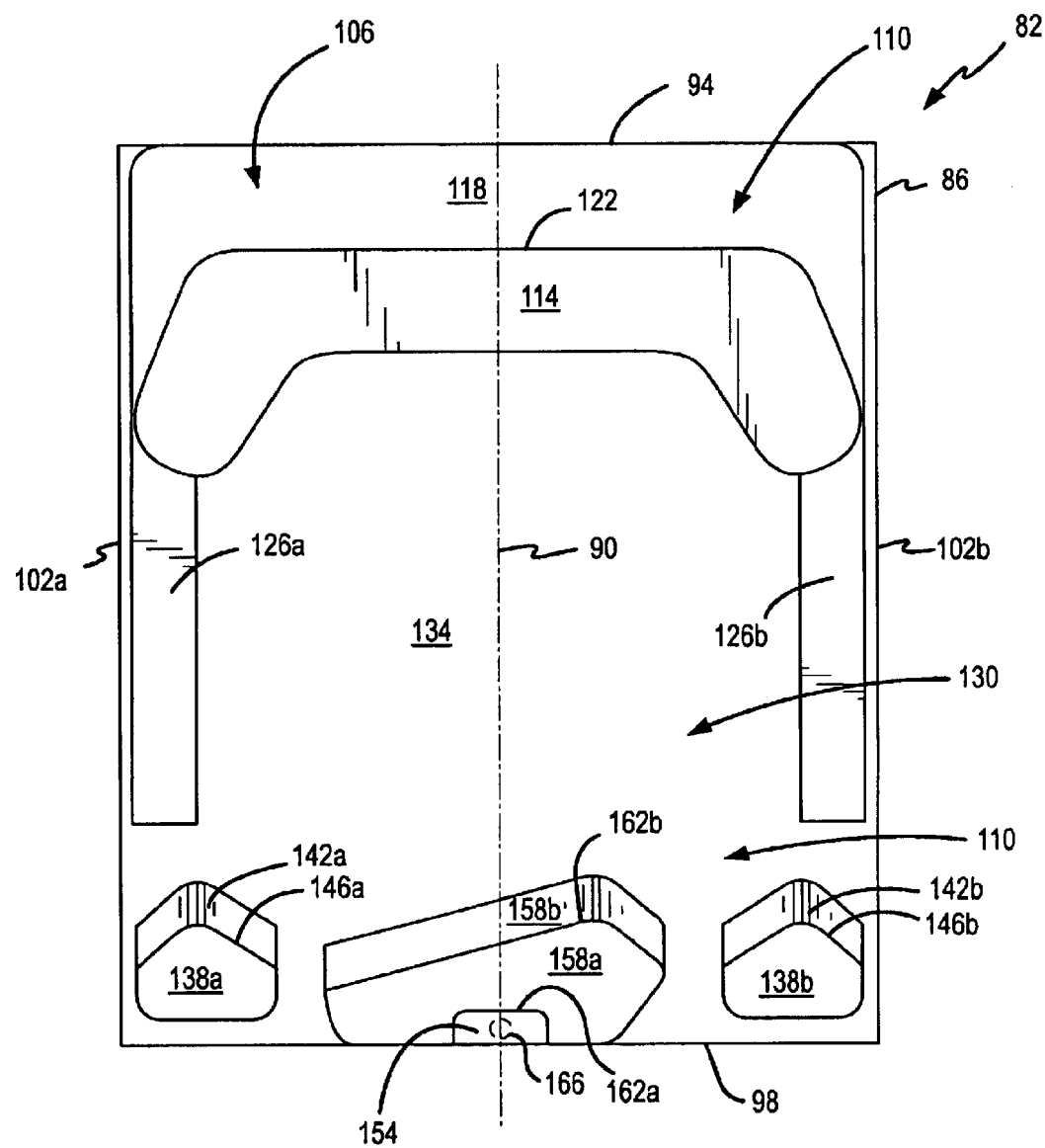
FIG. 3B is a bottom view of the slider of FIG. 3A.

Details regarding an exemplary flying-type slider having an air bearing surface (ABS) that carries a read/write head are illustrated in FIGS. 3A and 3B. The slider 82 of FIGS. 3A and 3B may be utilized by the disk drive 10 of FIG. 1 and generally includes a slider body 86 that has a longitudinal extent along a central reference axis 90. Hereafter, in relation to the slider 82, the term "longitudinal or the like means in a direction which is along or parallel with this reference axis 90, while the term "lateral" or the like means in a direction that is at least generally "across" this reference axis 90. An at least generally rectangular configuration or profile in plan view is utilized by the slider body 86, although other such configurations or profiles may be appropriate. In this regard, the slider body 86 includes: a leading edge 94 which is laterally extending and disposed at least generally transversely to the airflow carried by its corresponding rotating disk 18; a trailing edge 98 which is also laterally extending (and thereby also disposed at least generally transversely to the airflow carried by the rotating disk 18) and which is longitudinally spaced from the leading edge 94 (i.e., spaced from the leading edge 94 along the reference axis 90); and a pair of sides 102a and 102b which are laterally spaced and extend longitudinally between the leading edge 94 and the trailing edge 98. Orientations for the leading edge 94, the trailing edge 98, and the sides 102a, 102b which differ from that illustrated in FIGS. 3A and 3B may be appropriate. In addition, the slider body 86 includes a lower surface 106 that at least generally projects toward its corresponding disk 18 when installed in a disk drive such as the disk drive 10 of FIG. 1. Generally, the lower surface 106 of the slider body 86 includes an ABS (air bearing surface) system 110.

Air that is carried by the rotating disk 18 during disk drive operations is pressurized by the ABS system 110 in a desired manner so as to exert a "lifting" force on the slider body 86, which generally refers to a force that urges the slider body 86 at least generally away from the corresponding data storage disk 18. The ABS system 110 of the slider 82 generally includes a front ABS pad 114 that is a continuous surface, that is horizontally disposed, that is disposed at least generally toward the leading edge 94 of the slider 82, and that has a leading portion that is at least generally laterally extending. Pressurization of the air carried by the rotating disk 18 is provided by a front ABS step 118 that is disposed immediately in front of the front ABS pad 114 in the direction of the leading edge 94. This front ABS step 118 is recessed relative to the front ABS pad 114 by an at least generally vertically disposed riser 122. The front ABS step 118 is also horizontally disposed and is a continuous surface as well. Other ways of pressurizing the front ABS pad 114 could be utilized.

Still referring to FIGS. 3A and 3B, a pair of laterally spaced side rails 126a, 126b extend toward, but not to, the trailing edge 98 of the slider 82. These rails 126a, 126b can be disposed at the same elevation as the front ABS step 118, although such need not necessarily be the case. Disposed behind the front ABS pad 114 and between the pair of side rails 126a, 126b is a negative pressure or "suction" cavity 130. A base 134 of the cavity 130 is significantly recessed in relation to both the front ABS pad 114 and the side rails 126a, 126b. As such, air that flows over the front ABS pad 114 flows over the cavity 130 in such a manner so as to generate a negative pressure therein which may be used to have an effect upon and/or control the flight of the slider 82. That is, the air that flows over the cavity 130 effects a force on the slider 82 that is at least generally opposed to the lifting forces that are exerted on the slider body 86 by the ABS system 110, such that the negative pressure will tend to urge the slider 82 toward its corresponding disk 18. The base 134 of the cavity 130 is recessed relative to the ABS system 110 by a sufficient amount so as to allow the noted negative pressure to be generated therein. This negative pressure region is laterally confined by the side rails 126a, 126b. Other configurations may be utilized for the side rails 126a, 126B and/or the front ABS pad 114 for purposes of defining the negative pressure or suction cavity 130.

The ABS system 110 for the slider 82 further includes a pair of rear ABS pads 138a, 138b that are both a continuous surface, that are both horizontally disposed, that are disposed at least generally toward the trailing edge 98 of the slider body 86, and that are at least generally proximate to the sides 102a, 102b, respectively, of the slider body 86. In one embodiment, the trailing edge of each of the rear ABS pads 138a, 138b is disposed within about 0.002 inch of the trailing edge 98 (and thereby encompassing being disposed at the trailing edge 98). Moreover, in one embodiment the rear ABS pads 138a, 138b are disposed equidistantly from the reference axis 90, although such need not be the case.

Pressurization of the air carried by the rotating disk 18 is provided by a pair of rear ABS steps 142a, 142b that are both a continuous surface, that are both horizontally disposed, and further that are disposed immediately in front of their corresponding rear ABS pad 138a, 138b, respectively, in the direction of the leading edge 94. Each rear ABS step 142a, 142b is recessed relative to its corresponding rear ABS pad 138a, 138b by an at least generally vertically disposed riser 146a, 146b. Other ways of pressurizing the rear ABS pads 138a, 138b could be utilized. Generally, these rear ABS pads 138a, 138b may be used to enhance the roll stiffness of the slider 82 as it flies over its corresponding data storage disk 18. There may be instances where the rear ABS pads 138a, 138b are not disposed the same distance from the axis 90 as noted above, where they are not disposed the same distance from the trailing edge 98, or both. Moreover, in some instances there may be only one such rear ABS pad 138, while in yet other instances there may not be any rear ABS pad 138 (neither alternative being shown).

The front ABS pad 114 and the rear ABS pads 138a, 138b both contribute to the total lifting forces that are exerted on the slider body 86 during disk drive operations. Another substantial contributor to the total lifting forces that are exerted on the slider body 86 is provided by an ABS pad 154 that is also a continuous surface, that is also horizontally disposed, and that carries the read/write head 166. Therefore, the ABS pad 154 will hereafter be referred to as a "transducer ABS pad 154." The transducer ABS pad 154 is disposed at least generally toward the trailing edge 98 of the slider body 86. Although the transducer ABS pad 154 is illustrated as being disposed on the reference axis 90 and symmetrically relative thereto in the lateral dimension, such need not be the case. That is, the transducer ABS pad 154 could be disposed in non-symmetrical relation to the center reference axis 90 (e.g., off to one side of the axis 90).

A read/write head 166 is mounted on the slider 82 within the transducer ABS pad 154 as noted. That is, the head 166 is embedded within the transducer ABS pad 154, as indicated by the dashed line for the head 166 in FIGS. 3A and 3B. Generally, the size of the transducer ABS pad 154 is selected such that at least a substantial portion of the transducer ABS pad 154, and more preferably the entirety of the transducer ABS pad 154, protrudes toward the disk 18 during read/write operations (or while the head 166 is otherwise involved in some "signaling" operation). As will be discussed in more detail below, configuring the transducer ABS pad 154 in this manner reduces the effect of read/write operations on the fly height of the slider 82. Based upon the foregoing, the transducer ABS pad 154 may have a very small surface area. For example, the surface area of the transducer ABS pad 154 (more specifically its air bearing surface) might be no more than 0.00001 in$^2$. Another way to characterize the size of the transducer ABS pad 154 is that the ratio of the surface area of the transducer ABS pad 154 (more specifically the area of the corresponding air bearing surface) to an area bounded by the leading edge 94, the trailing edge 98, and the sides 102a, 102b of the slider body 86 might be no more than about 0.004 in one embodiment. Stated another way, a ratio of the surface area of the transducer ABS pad 154 to the area encompassed by a projection of the lower surface 106 of the slider body 86 onto a reference plane may be within the above-noted limits.

Pressurization of the air carried by the rotating disk 18 is provided by a first transducer ABS step 158a that is disposed immediately in front of the transducer ABS pad 154 in the direction of the leading edge 94 and that is horizontally disposed, and by a second transducer ABS step 158b that is disposed immediately in front of the first transducer ABS step 158a in the direction of the leading edge 94 and that is also horizontally disposed. Both the first and second transducer ABS steps 158a, 158b are continuous surfaces. The first transducer ABS step 158a is recessed relative to the transducer ABS pad 154 by an at least generally vertically disposed riser 162a, while the second transducer ABS step 158*b* is recessed relative to the first transducer ABS step 158*a* by an at least generally vertically disposed riser 162*b*. Other ways of pressurizing the transducer ABS pad 154 could be utilized. In one embodiment, the first transducer ABS step 158*a* is disposed at the same elevation as each of the rear ABS pads 138*a*, 138*b* and is itself an air bearing surface, while the second transducer ABS step 158*b* is disposed at the same elevation as the rear ABS steps 142*a*, 142*b*.

Figure 4A:
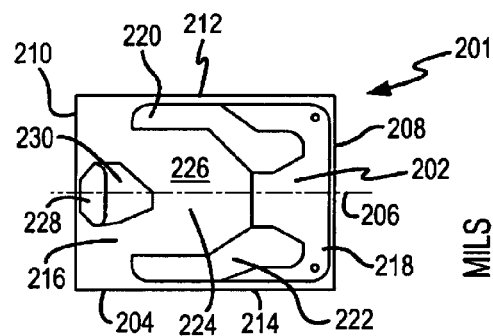
FIGS. 4A–4C are bottom views of three different flying-type slider designs with different air bearing designs, each of which may be utilized by the disk drive of FIG. 1.

While the slider 82 is one example of a slider that may be used in place of the slider 42 of FIGS. 1 and 2, FIGS. 4A–4C illustrate three other exemplary sliders that may be used in place of the slider 42 of FIGS. 1 and 2. FIGS. 4A shows a bottom view of a slider 201 having an air bearing surface (ABS) system 202 that differs from the ABS system 110 of FIGS. 3A and 3B, and that may be utilized by the disk drive 10 of FIG. 1. The slider 201 of FIG. 4A generally includes a slider body 204 that has a longitudinal extent along a central reference axis 206. An at least generally rectangular configuration or profile in plan view is utilized by the slider body 204, although other such configurations or profiles may be appropriate. In this regard, the slider body 204 includes a leading edge 208 which is laterally extending and disposed at least generally transversely to the airflow carried by its corresponding rotating disk 18. The slider body 204 also has a trailing edge 210, which is also laterally extending and thereby also disposed at least generally transversely to the airflow carried by the rotating disk 18. In addition, this trailing edge 210 is longitudinally spaced from the leading edge 208. The slider body 204 also includes a pair of sides 212 and 214 which are laterally spaced and extend longitudinally between the leading edge 208 and the trailing edge 210. Orientations for the leading edge 208, the trailing edge 210, and the sides 212, 214, which differ from that illustrated in FIG. 4A, may be appropriate. The slider body 204 includes a lower surface 216 that at least generally projects toward its corresponding disk 18 when installed in a disk drive, such as the disk drive 10 of FIG. 1.

Air that is carried by the rotating disk 18 during disk drive operations is pressurized by the ABS system 202 in a desired manner so as to exert a "lifting" force on the slider body 204, which generally refers to a force that urges the slider body 204 at least generally away from the corresponding data storage disk 18. The ABS system 202 of the slider 201 generally includes a front ABS pad 218 that is a continuous surface, that is horizontally disposed, that is disposed at least generally toward the leading edge 208 of the slider 201, and that has a leading portion that is at least generally laterally extending.

Still referring to FIG. 4A, a pair of laterally spaced side rails 220, 222 extend toward, but not to, the trailing edge 210 of the slider 201. These rails 220, 222 can be disposed at the same elevation, although such need not necessarily be the case. Generally these rails 220, 222 are recessed relative to the magnitude of protrusion of the front ABS pad 218 relative to the bottom surface 216 of the slider body 204. Disposed behind the front ABS pad 218 and between the pair of side rails 220, 222 is a negative pressure or "suction" cavity 224. A base 226 of the cavity 224 is significantly recessed in relation to both the front ABS pad 218 and the side rails 220, 222. Accordingly, air that flows over the front ABS pad 218 flows over the cavity 224 in such a manner so as to generate a negative pressure therein which may be used to have an effect upon and/or control the flight of the slider 201. That is, the air that flows over the cavity 224 effects a force on the slider 201 that is at least generally opposed to the lifting forces that are exerted on the slider body 204 by the ABS system 202, such that the negative pressure will tend to urge the slider 201 toward its corresponding disk 18. The base 226 of the cavity 224 is recessed relative to the ABS system 202 by a sufficient amount so as to allow the noted negative pressure to be generated therein. This negative pressure region is laterally confined by the side rails 220, 222. Other configurations may be utilized for the side rails 220, 222 and/or the front ABS pad 218 for purposes of defining the negative pressure or suction cavity 224.

The ABS system 202 for the slider 201 further includes a rear ABS pad 228 that is also a continuous surface, that is also horizontally disposed, and that may carries a read/write head (not shown). The rear ABS pad 228 is disposed at least generally toward the trailing edge 210 of the slider body 204. Although the rear ABS pad 228 is illustrated as being positioned on the reference axis 206 and symmetrically relative thereto in the lateral dimension, such need not be the case. That is, the rear ABS pad 228 may be disposed in nonsymmetrical relation to the reference axis 206 (e.g., off to one side of the axis 206).

Pressurization of the air carried by the rotating disk 18 is provided at least in part by a rear ABS step 230 that is disposed immediately in front of the rear ABS pad 228 in the direction of the leading edge 208 and that is horizontally disposed. This rear ABS step 230 is generally a continuous surface and recessed relative to the rear ABS pad 228. Other ways of pressurizing the rear ABS pad 228 may be utilized. In one embodiment, the rear ABS step 230 is disposed at the same elevation as each of the first and second lateral side rails 220, 222.

Figure 4D:
FIGS. 4D–4F are three-dimensional graphs illustrating the "footprints" of the sliders of FIGS. 4A–4C, respectively.
Figure 4B:
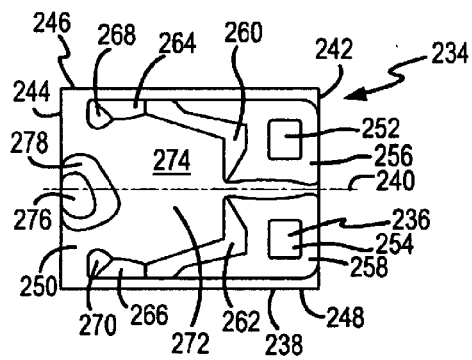

FIG. 4B illustrates a bottom view of another exemplary slider 234 having an air bearing surface (ABS) system 236 that differs from the air bearing surface systems 110, 202 of FIGS. 3B, and 4A, respectively, and that may be utilized by the disk drive 10 of FIG. 1. The slider 234 of FIG. 4B includes a slider body 238 that has a longitudinal extent along a central reference axis 240. An at least generally rectangular configuration or profile in plan view is utilized by the slider body 238, although other configurations/ designs may be appropriate. In this regard, the slider body 238 includes a laterally extending leading edge 242 disposed at least generally transversely to the airflow carried by its corresponding rotating disk 18. The slider body 238 also has a laterally extending trailing edge 244 disposed at least generally transversely to the airflow carried by the rotating disk 18 and longitudinally spaced from the leading edge 242. The slider body 238 also includes a pair of laterally spaced sides 246, 248 that extend longitudinally between the leading edge 242 and the trailing edge 244. Orientations for the leading edge 242, the trailing edge 244, and the sides 246, 248 may differ from that illustrated in FIG. 4B. In addition, the slider body 238 includes a lower surface 250 that at least generally projects toward its corresponding disk 18 when installed in a disk drive, such as the disk drive 10 of FIG. 1.

Air that is carried by the rotating disk 18 during disk drive operations is pressurized by the ABS system 236 in a desired manner so as to exert a "lifting" force on the slider body 238, which generally refers to a force that urges the slider body 238 at least generally away from the corresponding data storage disk 18. The ABS system 236 of the slider 234 generally includes laterally spaced first and second front ABS pads 252, 254 that are continuous surfaces, that are horizontally disposed, that are disposed at least generally toward the leading edge 242 of the slider 234. First and second front ABS steps 256, 258 laterally and longitudinally surround the respective first and second ABS pads 252, 254. While the first and second front ABS steps 256, 258 are positioned such that they abut the leading edge 242 of the slider body 238, variational embodiments exist wherein one or both the front ABS steps 256, 258 are set back from the leading edge 242 of the slider body 238. These front ABS steps 256, 258 are disposed at a lower elevation than the corresponding front ABS pads 252, 254. In other words, the front ABS steps 256, 258 generally protrude from (i.e., extend out from) the bottom surface 250 of the slider body 238 to a lesser degree than the first and second ABS pads 252, 254. Positioned between the first and second front ABS steps 256, 258 is a central channel 259 that is recessed relative to the first and second front ABS steps 256, 258 and that is generally coplanar with the lower surface 250 of the slider body 238.

Disposed behind the first and second front ABS steps 256, 258 are respective laterally spaced first and second intermediate ABS pads 260, 262, which are continuous, horizontally disposed surfaces. The horizontally disposed surfaces of the first and second intermediate ABS pads 260, 262 may be substantially coplanar with the horizontally disposed surfaces of the first and second front ABS pads 252, 254. First and second laterally spaced side rails 264, 266 are disposed behind and abut the respective first and second intermediate ABS pads 260, 262. These rails 264, 266 may be disposed at the same elevation, although such need not necessarily be the case. In addition, these rails 264, 266 are generally recessed relative to the magnitude of protrusion of the front ABS pad 218, but also protrude from (i.e., extend out from) the lower surface 250 of the slider body 238. Disposed behind the first and second side rails 264, 266 are laterally spaced respective first and second rear ABS pads 268, 270. As with most ABS pads, these first and second rear ABS pads 268, 270 are generally continuous, horizontally disposed surfaces. These rear ABS pads 268, 270 are generally disposed at the same elevation, although such need not necessarily be the case.

Disposed behind the intermediate ABS pads 260, 262 and between the same, as well as the side rails 264, 266 and the rear ABS pads 268, 270, is a negative pressure or "suction" cavity 272. A base 274 of the cavity 272 is significantly recessed in relation to the ABS pads 252, 254, 260, 262, 268, 270, the ABS steps 256, 258, and the side rails 264, 266. Accordingly, air that flows over the front ABS pads 252, 254 flows over the cavity 272 in such a manner so as to generate a negative pressure therein which may be used to have an effect upon and/or control the flight of the slider 234. That is, the air that flows over the cavity 272 effects a force on the slider 234 that is at least generally opposed to the lifting forces that are exerted on the slider body 238 by the ABS system 236, such that the negative pressure will tend to urge the slider 234 toward its corresponding disk 18. The base 274 of the cavity 272 is recessed relative to the ABS system 236 by a sufficient amount so as to allow the noted negative pressure to be generated therein. This negative pressure region is laterally confined by the intermediate ABS pads 260, 262, the side rails 264, 266, and the rear ABS pads 268, 270. Other configurations may be utilized for one or more of the intermediate ABS pads 260, 262, the side rails 264, 266, and the rear ABS pads 268, 270 for purposes of defining the negative pressure or suction cavity 272.

The ABS system 236 for the slider 234 further includes a central rear ABS pad 276 that is also a horizontally disposed, continuous surface and that may carry a read/write head (not shown). The central rear ABS pad 276 is disposed at least generally toward the trailing edge 244 of the slider body 238. Although the central rear ABS pad 276 is illustrated as being positioned on the reference axis to 40, such need not be the case. That is, the central rear ABS pad 276 may be disposed off to one side of the axis 240.

Pressurization of the air carried by the rotating disk 18 is also provided at least in part by a central rear ABS step 278 that is disposed laterally and immediately in front of the central rear ABS pad 276 and that is horizontally disposed. This central rear ABS step 278 is generally a continuous surface and recessed relative to the central rear ABS pad 276. Other ways of pressurizing the central rear ABS pad 276 may be utilized. In some embodiments, the central rear ABS step 278 is disposed at the same elevation as one or more of the first and second lateral side rails 264, 266 and the first and second front ABS steps 256, 258.

Figure 4E:
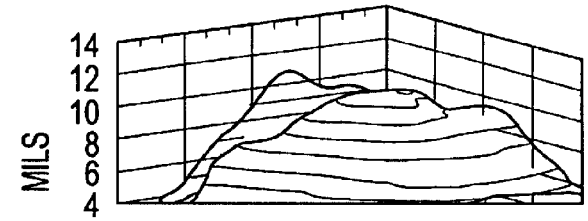
Figure 4C:
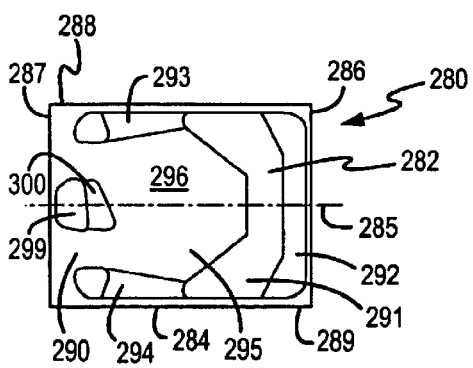

FIGS. 4C shows a bottom view of yet another exemplary slider 280 having an air bearing surface (ABS) 282 that differs from the air bearing surface systems 110, 202, 236 of FIGS. 3B, 4A, and 4B, and that may be utilized by the disk drive 10 of FIG. 1. The slider 280 of FIG. 4C generally includes a slider body 284 that has a longitudinal extent along a central reference axis 285. An at least generally rectangular configuration or profile in plan view is utilized by the slider body 284, although other such configurations or profiles may be appropriate. In this regard, the slider body 284 includes a laterally extending leading edge 286 and a laterally extending trailing edge 287, both being disposed at least generally transversely to the airflow carried by the rotating disk 18. In addition, the leading and trailing edges 286, 287 are longitudinally spaced from one another. The slider body 284 also includes a pair of laterally spaced sides 288, 289 that extend longitudinally between the leading and trailing edges 286, 287. Orientations for one or more of the leading edge 286, the trailing edge 287, and the sides 288, 289 which differ from that illustrated in FIG. 4C may be appropriate. A lower surface 290 of the slider body 286 at least generally projects toward its corresponding disk 18 when installed in a disk drive such as the disk drive 10 of FIG. 1.

As with most other ABS systems, air that is carried by the rotating disk 18 during disk drive operations is pressurized by the ABS system 282 in a desired manner so as to exert a "lifting" force on the slider body 284, which generally refers to a force that urges the slider body 284 at least generally away from the corresponding data storage disk 18. The ABS system 284 of the slider 280 generally includes a front ABS pad 291 that is a continuous surface, that is horizontally disposed, that is disposed at least generally toward the leading edge 286 of the slider 280, and that has a leading portion that is at least generally laterally extending. Pressurization of the air carried by the rotating disk 18 is provided by a front ABS step 292 that is disposed immediately in front of the front ABS pad 291 in the direction of the leading edge 286. This front ABS step 292 is recessed relative to the front ABS pad 291. In other words this front ABS step 292 protrudes from (i.e., extends out from) the lower surface 290 of the slider body 284 to a lesser degree than the front ABS pad 291 protrudes from the lower surface 290. This front ABS step 292 is generally horizontally disposed and is a continuous surface as well. However, other ways of pressurizing the front ABS pad 291 could be utilized.

First and second laterally spaced side rails 293, 294 extend toward, but not to, the trailing edge 287 of the slider 280 of FIG. 4C. These side rails 293, 294 can be disposed at the same elevation, although such need not necessarily be the case. Generally these rails 293 cavity 94 are recessed relative to the magnitude of protrusion of the front ABS pad 291 relative to the bottom surface 290 of the slider body 284.

Disposed behind the front ABS pad 291 and between the pair of side rails 293, 294 is a negative pressure or "suction" cavity 295. A base 296 of the cavity 295 is significantly recessed in relation to both the front ABS pad 291 and the side rails 293, 294. Accordingly, air that flows over the front ABS pad 291 flows over the cavity 295 in such a manner so as to generate a negative pressure therein which may be used to have an effect upon and/or control the flight of the slider 280. That is, the air that flows over the cavity 295 effects a force on the slider 280 that is at least generally opposed to the lifting forces that are exerted on the slider body 284 by the ABS system 282, such that the negative pressure will tend to urge the slider 280 toward its corresponding disk 18. The base 296 of the cavity 295 is recessed relative to the ABS system 282 by a sufficient amount so as to allow the noted negative pressure to be generated therein. This negative pressure region is laterally confined by the side rails 293, 294. Other configurations may be utilized for the side rails 293, 294 and/or the front ABS pad 291 for purposes of defining the negative pressure or suction cavity 295.

The ABS system 282 for the slider 280 further includes first and second rear ABS pads 297, 298 that are also horizontally disposed, continuous surfaces. The first and second rear ABS pads 297, 298 are disposed at least generally toward the trailing edge 287 of the slider body 284. In addition, these first and second rear ABS pads 297, 298 abut the respective first and second side rails 293, 294. Further, the ABS system 282 of the slider 280 also has a central rear ABS pad 299. Although the central rear ABS pad 299 is illustrated as being positioned on the reference axis 285 and symmetrically relative thereto in the at least in a lateral dimension, such need not be the case. That is, the central rear ABS pad 299 may be disposed in non-symmetrical relation to the reference axis 285 (e.g., off to one side of the axis 285).

Pressurization of the air carried by the rotating disk 18 is provided at least in part by a central rear ABS step 300 that is disposed immediately in front of the central rear ABS pad 299 in the direction of the leading edge 286 and that is horizontally disposed. This central rear ABS step 300 is generally a continuous surface and recessed relative to the central rear ABS pad 299. Other ways of pressurizing the central rear ABS pad 299 may be utilized. In some embodiments, the central rear ABS step 300 is disposed at the same elevation as one or more of the front ABS step 292 and the first and second lateral side rails 293, 294.

The various embodiments of the sliders of FIGS. 3A, 3B, 4A, 4B, and 4C are included to simply illustrate that a wide variety of ABS pads (e.g., 114), ABS steps (e.g., 118), and/or rails (e.g., 126a, 126b) may be utilized to define a negative pressure producing suction cavity (e.g., 130). Further, the various embodiments of the sliders of FIGS. 3A, 3B, 4A, 4B, and 4C are included to illustrate that these ABS pads, ABS steps, and/or rails may exhibit a variety of sizes, shapes, orientations, designs, and/or configurations. Even further, the number of ABS pads, ABS steps, and/or rails may vary.

Figure 4F:
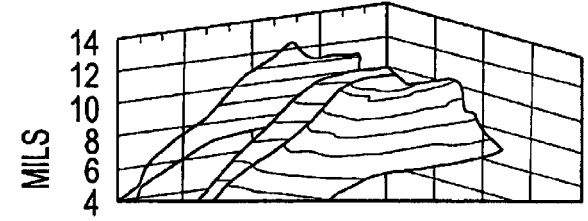

In addition to including the various embodiments of the sliders of FIGS. 4A, 4B, and 4C to illustrate the variety of slider designs/configurations that may be utilized to define a negative pressure producing suction cavity, the sliders of FIGS. 4A, 4B, and 4C have been included also because these three designs were tested to determine the size of the respective footprint that accompanies each corresponding slider design. In other words, sliders 201, 234, 280 could be installed on a disk drive (such as disk drive 10 of FIG. 1) and their performance analyzed to determine the radial distance that is traveled during unloading of each of the respective sliders as a function of pitch angle and roll angle. FIGS. 4D, 4E, and 4F reflect the data collected from analyzing the unloading performances of these sliders. FIG. 4D corresponds with the data collected for the slider 201 of FIG. 4A and illustrates that the radial distance of the corresponding data storage disk (e.g., 18) traveled during unloading of the slider 201 was generally about 4 mils up to about 11 mils. Similarly, FIG. 4E corresponds with the data collected for the slider 234 of FIG. 4B and illustrates that the radial distance of the corresponding data storage disk (e.g., 18) traveled during unloading of the slider 234 was also generally about 4 mils up to about 11 mils. Lastly, FIG. 4F corresponds with the data collected for the slider 280 of FIG. 4C and illustrates that the radial distance of the corresponding data storage disk (e.g., 18) traveled during unloading of the slider 280 was generally about 4 mils up to in excess of 12 mils.

Figure 5:
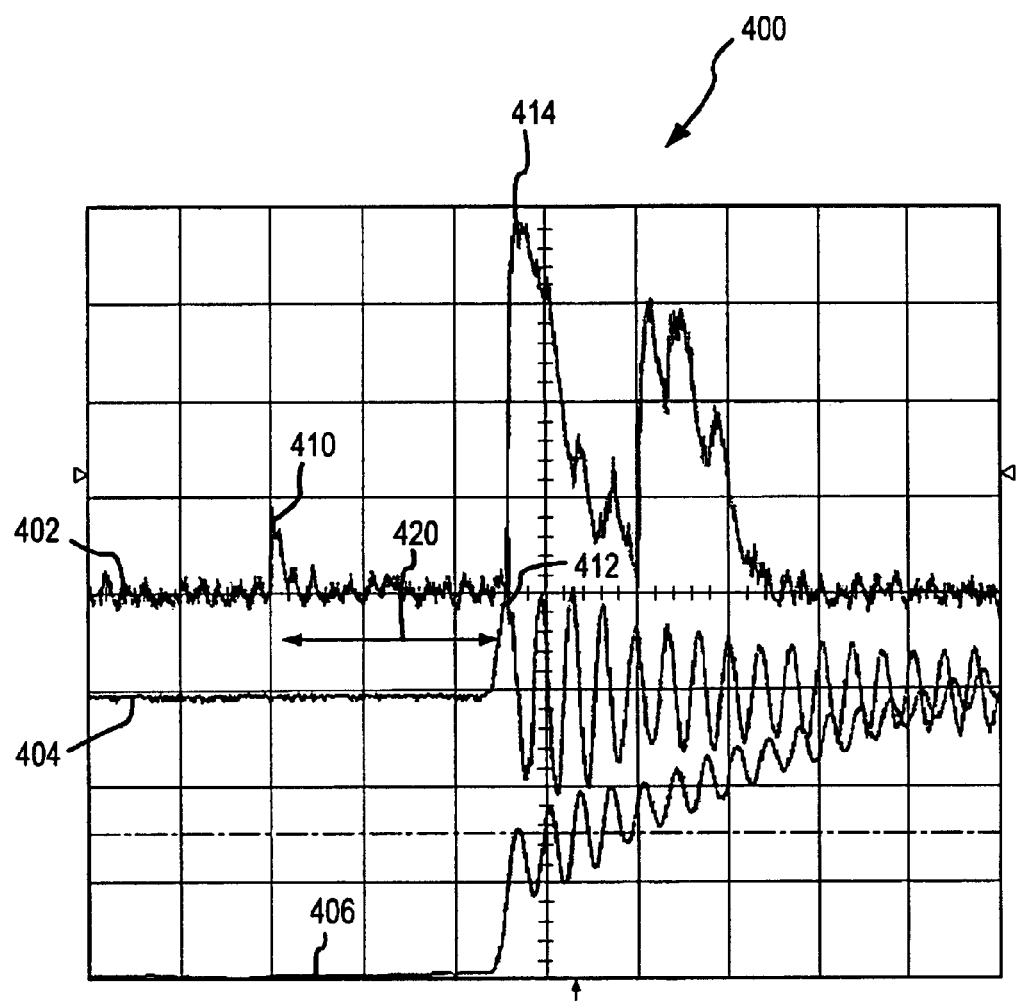
FIG. 5 is a line graph illustrating one method of measuring the "footprint" of a slider.

FIG. 5 shows a read-out 400 of an exemplary technique for measuring slider footprints. As previously mentioned, a "footprint" of a slider is generally the radial distance of the corresponding disk surface that the slider travels while the negative pressure component(s) is being dissolved; this radial distance of the corresponding disk surface generally cannot be utilized to store data. A first line 402 of the read-out 400 corresponds with the acoustics emitted during operation of the disk drive 10. A second line 404 of the read-out 400 corresponds with a measure of the annular velocity of the slider 42 as the slider 42 rotates (via the actuator arm assembly 26) in a direction indicated by arrow 80 toward the ramp assembly 78, as well as its annular velocity upon interfacing with the ramp assembly 78 (i.e., during unloading of the slider 42 out of operative relationship with the corresponding data storage disk 18). A third line 406 of the read-out 400 corresponds with the vertical displacement of the slider 42 during disk drive operations including unloading of the slider 42 from operational interface with the disk 18. These first, second, and third lines 402, 404, 406 are plotted on the read-out 400 as they relate to time.

This technique of measuring slider footprints, utilizing the read-out 400 of FIG. 5, is conducted by initially detecting a first acoustic peak 410 on the read-out 400 corresponding to the impact of an appropriate portion of the actuator arm assembly 26 contacting the load/unload ramp assembly 78. Another step of the technique includes detecting a first velocity peak 412 on the read-out 400 corresponding to a moment the negative pressure substantially dissipates and the slider 42 is generally moved away from the data storage disk 18. The duration of time (indicated by arrow 420) that passes between detection of the first acoustic peak 410 and the first velocity peak 412 is indicative of the time required to dissipate the negative pressure produced by the slider 42 after impact of an appropriate portion of the actuator arm assembly 26 contacting the load/unload ramp assembly 78. Since the annular velocity of the slider 42, illustrated by the second line 404, is substantially constant prior to formation of the first velocity peak 412, the amount of annular/radial disk space wasted (i.e., the footprint) can be calculated by simply manipulating the well-known formula for velocity (v=d/t, wherein "v" refers to the annular velocity, "d" refers to the annular distance traveled, and "t" refers to time) to get "d=vt". In other words, the amount of wasted annular disk space (or footprint), "d", can be defined by the product of the annular velocity 404 of the slider 42 before formation of the peak 412 over the time 420.

Still referring to FIG. 5, since suction cavities (such as 224, 272, and/or 295) of sliders generally tend to bring about an acoustically detectable emanation (i.e., a "popping" sound) upon the dissipation of the negative pressure during an unloading operation, duration of time measured between the first acoustic peak 410 and a second acoustic peak 414 may be substantially the same as the time 420. In other words, an alternate technique to measuring a footprint of particular slider may include determining the time that passes between the sound made by an appropriate portion of the actuator arm assembly 26 contacting the load/unload ramp assembly 78 (indicated by the first acoustic peak 410) and the "popping" sound emitted as a result of the negative pressure dissipating (indicated by the second acoustic peak 414). Other methods of measuring footprints associated with particular sliders may be appropriate.

Figure 6:
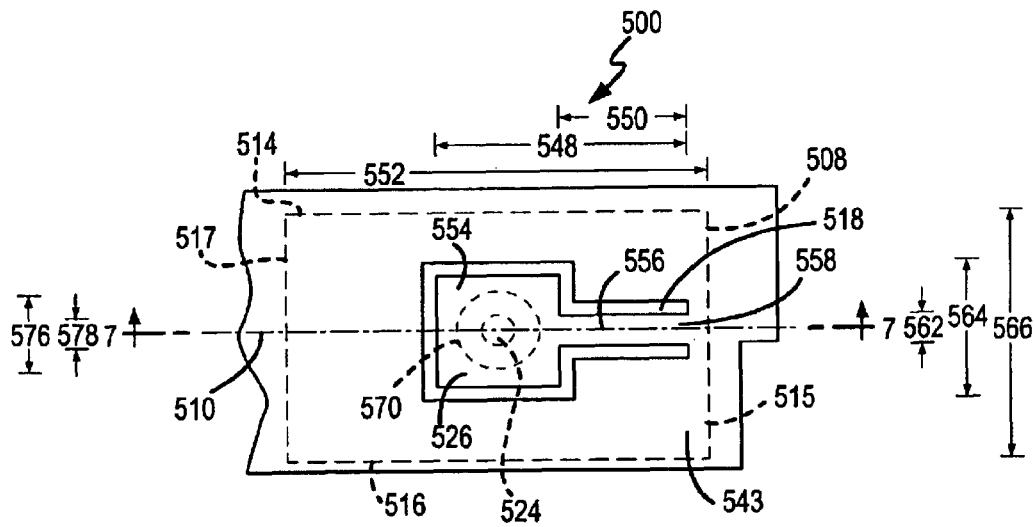
FIG. 6 is a top view of a slider assembly that may be utilized by any appropriate type of load/unload disk drive design.
Figure 7:
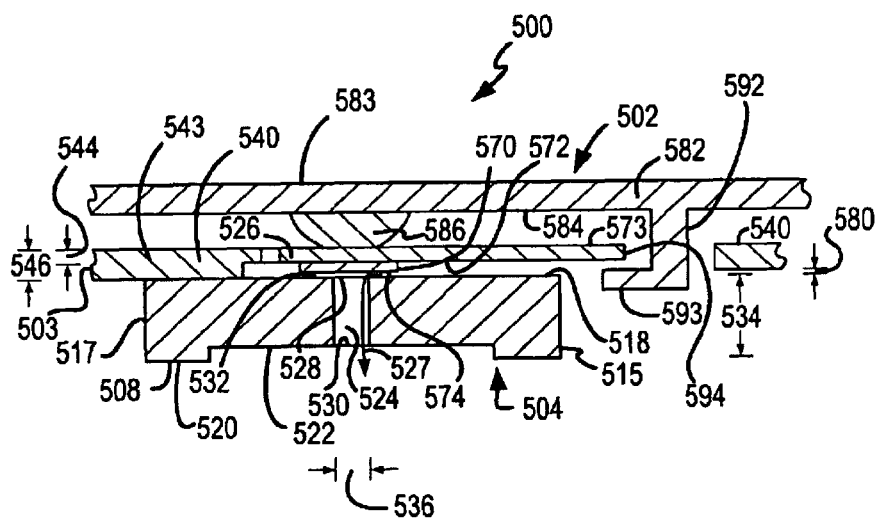
FIG. 7 is a cross-sectional, schematic view of the slider assembly of FIG. 6, taken along cut-line 7—7, along with an associated load beam that collectively define a vent assembly, and with the vent assembly being in an open position.

FIGS. 6–9 illustrate a vent assembly 500 for use in a load/unload-type disk drive, which is utilized to rapidly dissolve the negative pressure within the suction cavity/cavities of the slider for parking operations, and which will be described in relation to the disk drive 10 of FIG. 1. The vent assembly 500 generally includes a load beam assembly 502, a valve assembly 503, and a slider assembly 504. The slider assembly 504 is generally made up of a slider body 508 that at least generally extends along a central, longitudinal reference axis 510. This reference axis 510 also serves as an imaginary cut-line 7—7 from which the cross-sectional view of FIG. 7 is taken. In addition to the reference axis 510, the slider body 508 generally includes first and second sides 514, 516, respectively, that are at least generally longitudinally extending and laterally spaced relative to the reference axis 510. A leading edge 515 and a trailing edge 517 of the slider body 508 are longitudinally spaced from each other relative to the reference axis 510. When the slider body 508 is incorporated into the disk drive 10, the data storage disk 18 is oriented such that it moves relative to the slider body 508 in a direction at least generally from the leading edge 515 of the slider body 508 toward the trailing edge 517 of the slider body 508.

The slider body 508 also has an upper surface 518 and a lower surface 520 that projects toward the disk 18 of the disk drive 10 when the slider body 508 is installed in the disk drive 10. "Upper" and "lower" are thereby defined in relation to the corresponding disk 18, and not necessarily the relative vertical position when installed in the drive 10. Generally, the lower surface 520 of the slider body 508 includes at least one air bearing surface (e.g., 202, 236, 282) for generating positive pressure to urge the slider body 508 away from the surface of the data storage disk 18, and a suction cavity (e.g., 224, 272, 295) for generating negative pressure to urge the slider body 508 toward the surface of the data storage disk 18. The slider body 508 may exhibit a variety of air bearing surfaces (such as, but not limited to, those illustrated in FIGS. 4A–4C).

Still referring to FIGS. 6–9, a first venting hole 524 extends entirely through the slider body 508 from the upper surface 518 to the lower surface 520 of the slider body 508. The first venting hole 524 is located on the lower surface 520 so as to be disposed within a suction cavity 522 of the slider body 508. This first venting hole 524 is generally cylindrical in the illustrated embodiment and may exhibit a diameter 536 of ranging between 0.1 mm and 0.3 mm. This diameter 536 is generally defined as the largest cross-sectional distance (i.e., measured parallel to the upper surface 518 of the slider body 508) across the first venting hole 524. Thus, the first opening 528 at the upper surface 518 of the slider body 508 may measure about 0.1 mm up to about 0.3 mm across. Preferably, this first venting hole 524 has a diameter 536 of about 0.2 mm. Alternatively, the first venting hole 524 may have a diameter 536 that ranges from about $\frac{1}{3}$ up to about $\frac{2}{3}$ of the thickness 534 of the slider body 508. Any appropriate shape and/or size may be utilized for the first venting hole 524 so long as the venting hole 524 can dissolve/dissipate the negative pressure in the associated suction cavity in the desired manner. Regardless of the shape, size, and/or configuration of the first venting hole 524, the same can be formed using a variety of appropriate processes including, but not limited to, laser or ultrasonic drilling and etching (e.g., photochemical).

The valve assembly 503 of the venting assembly 500 includes a first valve 526 and a first flexure apparatus 540. The valve assembly 503 of the venting assembly 500 generally interconnects the load beam assembly 502 and the slider body 504. Moreover, the first flexure apparatus 540 of the valve assembly 503 is generally attached to the load beam assembly 502, and the slider body 504 is generally mounted on the first flexure apparatus 540. Accordingly, the valve assembly 503 of the venting assembly 500 is designed to generally move up and down along with the load beam assembly 502 during normal disk drive operations since the valve assembly 503 is generally attached to the load beam assembly 502. As a functional overview, and referring to FIGS. 10–11B, this load beam assembly 502 generally interfaces with the load/unload ramp 78 to impose a lifting force on the load beam during unloading. So, when parking the slider 42 (i.e., withdrawing the slider body 504 from operational interface with the disk 18), the load beam assembly 502 may be forced away from its corresponding disk 18 by engaging the load/unload ramp 78 of the disk drive 10. The valve assembly 503 may not initially move in the direction indicated by arrow 598 (FIG. 9) with the load beam assembly 502 upon the load beam assembly 502 engaging the load/unload ramp 78. In other words, a spacing between the valve assembly 503 and the load beam assembly 502 may increase upon the load beam assembly 502 engaging the load/unload ramp 78. Stated yet another way, negative pressure within the suction cavity 522 of the slider body 508 may resist movement of the slider body 508 away from the disk 18. However, this increase in spacing between the load beam assembly 502 and the valve assembly 503 generally removes or at least significantly reduces a bias of the load beam assembly 502 on a first valve 526 of the valve assembly 503. Accordingly, the first valve 526 of the valve assembly 503 may exhibit an "open" configuration, wherein the first valve 526 is positioned to enable airflow through the first venting hole 524 of the slider body 508 at least in the general direction indicated by arrow 527 (FIG. 7) to in turn dissolve the negative pressure within the suction cavity 522 of the slider body 508. While the valve assembly 503 is generally made from an appropriate metal (e.g., stainless steel), other embodiments are contemplated wherein the valve assembly may include one or more appropriate piezo materials and/or microelectromechanical (MEM) assemblies to at least assist in control and/or transition of the valve assembly 503 between open and closed positions discussed herein.

This first valve 526 of the valve assembly 503 is generally associated with the first opening 528 of the first venting hole 524 near the upper surface 518 of the slider body 508 to regulate (i.e., prevent and/or enable) airflow passing entirely through the first venting hole 524, including passing through both first and second openings 528, 530 of the first venting hole 524. Accordingly, the first venting hole 524 is preferably oriented in such a manner that the second opening 530 of the first venting hole 524 is positioned at the base (e.g., 226, 274, 296) of the suction cavity 522. Thus, the second opening 530 of the first venting hole 524 defined by the lower surface 520 of the slider body 508 is generally unobstructed and completely exposed to the disk 18. Moreover, the first valve 526 is generally positioned over the first venting hole 524 near the upper surface 518 of the slider body 508. This first valve 526 is generally utilized for one or both allowing and preventing airflow through the first venting hole 524. As shown in FIG. 7, the first valve 526 has a first thickness 544, and a main body or base portion 543 of the valve assembly 503 has a second thickness 546 that is greater than the first thickness 544. In the embodiments of FIGS. 6–9, the first thickness 544 of the first valve 526 may be about 10 μm, and the second thickness 546 of the base portion 543 of the valve assembly 503 may be about 20 μm. However, variational embodiments may exhibit other appropriate first and second thicknesses 544, 546 of the respective first valve 526 and the base portion 543 of the valve assembly 503.

This first valve 526 may have a variety of designs and configurations as well. In the embodiment of FIGS. 6–9, the first valve 526 has a substantially square-shaped head 554 and an elongate shaft 556. A first length 548 of this first valve 526 may generally be about 0.75 mm,. wherein a second length 550 of just the shaft 556 may make up about 0.4 mm of the first length 548. To describe the first and second lengths 548, 550 in relationship to the slider body 508, the first length 548 of the first valve 526 may be up to about 75% of a body length 552 of the slider body 508. Similarly, the second length 550 of the shaft 556 of the. first valve 526 may be up to about 40% of the body length 552 of the slider body 508. As illustrated in FIG. 6, the body length 552 of the slider body 508 generally refers to a distance measured parallel to the reference axis 510 between the leading and trailing edges 515, 517, respectively, of the slider body 508. The shaft 556 of the first valve 526 may also have a first width 562 (measured substantially perpendicular to the reference axis 510) of up to about 0.2 mm, and the head 554 of the first valve 526 may have a second width 564 of up to about 0.67 mm. In relation to the body width 566 of the slider body 508, the first width 562 of the shaft 556 of the first valve 526 may be up to about 30% of the body width 566 of the slider body 508. Similarly, the head 554 of the first valve 526 may have a second width 564 of up to about 60% of the body width 566 of the slider body 508. The body width 566 of the slider body 508 generally refers to a distance between the first and second sides 514, 516 of the slider body 508. In addition, the first valve 526 generally has a modulus elasticity of about 200 GPa ($2.0 \times 10^{11}$ N/m$^2$), although other moduli of elasticity may be appropriate. As such, the valve assembly 503 (or at least the first valve 526) can be made from any appropriate material including (but not limited to) stainless steel.

The first valve 526 preferably has an attachment end 558 defined by where the first valve 526 is connected to the first flexure apparatus 540 of the valve assembly 503. As illustrated in FIGS. 6–9, the first valve 526 is generally configured as a cantilever. Accordingly, except for the attachment end 558, the first valve 526 is spaced from the first flexure apparatus 540 of the venting assembly. While the vent assembly 500 illustrated in FIGS. 6–9 illustrate that the attachment end 558 of the first valve 526 is disposed toward the leading edge 515 of the slider body 508, other embodiments may include an attachment end (e.g., 558) of a first valve (e.g., 524) disposed toward the trailing edge 517 of the slider body 508.

Figure 8:
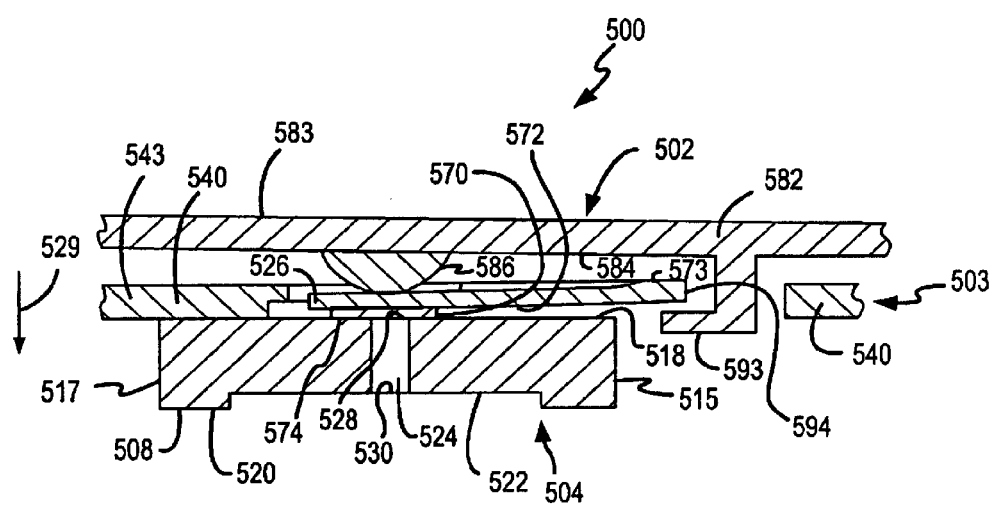
FIG. 8 is a cross-sectional, schematic view of the vent assembly of FIG. 7 in a closed position.

A first gasket 570 is positioned on a bottom surface 572 of the. first valve 526 generally to interface with or otherwise seal the first opening 528 of the first venting hole 524 at least when the first valve 526 is in a closed position (as shown in FIG. 8). As illustrated in FIG. 6, this first gasket 570 generally has a first diameter 576, and the first venting hole 524 has a second diameter 578 less than the first diameter 576. Thus, the first gasket 570 is generally designed and configured to entirely cover and seal the first opening 528 of the first venting hole 524 at least when in the closed position (as shown in FIG. 8). This first gasket 570 can be made from any appropriate gasket material such as (but not limited to) polyimid.

The first valve 526 is generally movable between a first position (shown in FIG. 8) and a second position (shown in FIG. 7). In the first position of FIG. 8, the first valve 526 at least substantially seals the first venting hole 524 at the first opening 528 defined by the upper surface 518 of the slider body 508. In other words, in this first position, the first valve 526 occludes the first venting hole 524 at the first opening 528 to effectively prevent airflow from passing entirely through the first venting hole 524. Conversely, in the second position of FIG. 7, the first valve 526 is generally spaced from the first venting hole 524 enabling the passage of airflow through the entirely of the slider body 508 via the first venting hole 524.

As shown in FIG. 7, the bottom surface 572 of the first valve 526 is spaced from the upper surface 518 of the slider body 508 when the first valve 526 is in an open position. This is generally due to the load beam assembly 502 being urged at least generally away from the valve assembly 503 in the direction indicated by the arrow 598 (FIG. 9) when the load beam assembly 502 interfaces with the load/unload ramp 78 of the disk drive 10. In other words, in this open position, the load beam assembly 502 is generally prevented from providing a biasing force on the first valve 526 of the valve assembly 503. Accordingly, the open position of the first valve 526 generally enables the passage of airflow entirely through the first venting hole 524 generally indicated by the arrow 527. Preferably, a underside 574 of the gasket 570 is spaced from the upper surface 518 of the slider body 508, which defines the first opening 528 of the first venting hole 524, by a distance 580 of at least about 1.0 mil (25.4 μm) when the first valve 526 is in the open position as shown in FIG. 7. In embodiments of the vent assembly 500 that may not include a gasket (e.g., 570), the distance (e.g., 580) between the upper surface 518 of the slider body 508, which defines the first opening 528 of the first venting hole 524, and the bottom surface 572 of the first valve 526 may be at least about 1.0 mil (25.4 μm) when the first valve 526 is in the open position. Other appropriate spacings between the upper surface 518 of the slider body 508 and either of the underside 574 of the gasket 570 or the bottom surface 572 of the first valve 526 may exist.

Referring to FIG. 8, the closed position of the first valve 526 is defined by the underside 574 of the gasket 570 of the first valve 526 contacting the upper surface 518 of the slider body 508, which defines the first opening 528 of the first venting hole 524, to effectively cover the first opening 528. This is generally due to the load beam assembly 502 (and here, a protrusion 586 of load beam assembly 502) biasing against the first valve 526 of the valve assembly 503 in the direction indicated by the arrow 529. In other words, in this closed position, the protrusion 586 of the load beam assembly 502 generally urges the first valve 526 of the valve assembly 503 into contact with slider body 508. Accordingly, the closed position of the first valve 526 generally prevents partly substantially inhibits the passage of airflow through the first venting hole 524. Thus, the first valve 526 is generally in a closed position when it substantially occludes/obstructs airflow from entering/exiting the first opening 528 of the first venting hole 524. In embodiments of the vent assembly 500 that may not include a gasket (e.g., 570), the closed position may be defined by the bottom surface 572 of the first valve 526 covering/occluding the first opening 528 of the first venting hole 524 defined by the upper surface 518 of the slider body 508.

In addition to the protrusion 586 of the load beam assembly 502, the load beam assembly 504 also includes a load beam 582 having a top surface 583 and a corresponding bottom surface 584 that generally faces the data storage disk 18 of the disk drive 10. A proximal (i.e., most adjacent the actuator arm (e.g., 30 of FIG. 1)) end 585 of the venting assembly 503 is attached to the bottom surface 584 of the load beam 582 generally using any appropriate fastener such as welding, adhesives, mechanical fasteners, and the like. As previously mentioned, this load beam 582 is equipped with the protrusion 586 that interfaces with the top surface 573 of the first valve 526 to urge the gasket 570 toward the first opening 528 of the first venting hole 524. Thus, during loading of the slider assembly 504 into operational interface with the corresponding data storage disk (e.g., 18), this protrusion 586 serves to close off the first venting hole 524, which, in turn, causes the formation of negative pressure in the suction cavity (e.g., 224, 272, 295) to urge the slider assembly 504 toward the corresponding disk (e.g., 18). This is generally due to the load beam assembly 502 being biased toward the slider assembly 504 and/or the slider assembly 504 being biased toward the load beam assembly 504 due to the positive pressure created by airflow interacting with the air bearing surfaces (e.g., 202, 236, 282) of the slider body 508. Thus, during normal read and/or write operations, the protrusion 586 of the load beam 582 is biased against the first valve 526 such that the first valve 526 substantially seals the first opening 528 of the first venting hole 524. Put another way, the protrusion 586 of the load beam 582 is generally positioned against the top surface 573 of the first valve 526 while the slider assembly 504 is exchanging magnetic data with the corresponding disk 18.

Figure 9:
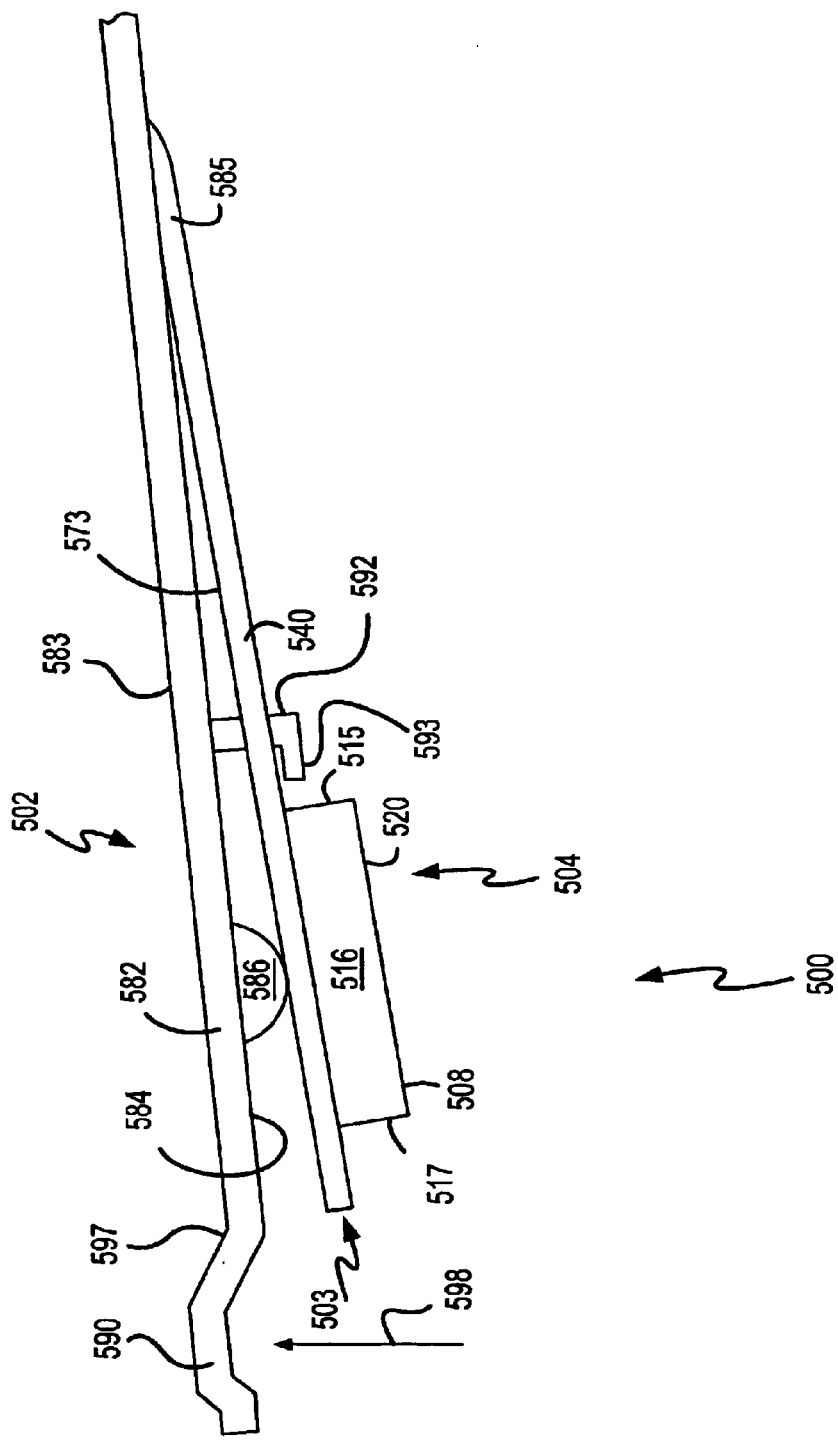
FIG. 9 is a schematic side view of the vent assembly of FIG. 7.

Conversely, in the unloading position, the protrusion 586 of the load beam 582 may be spaced from the first valve 526 such that an air flow passage 532 exists between the first opening 528 of the first venting hole 524 and the gasket 570 of the first valve 526. That is, the protrusion 586 of the load beam 582 is separated from (i.e. avoids biasing against) the first valve 526 of the flexure apparatus 540 at least at some point during taking the slider assembly 504 out of operational interface with the corresponding disk 18 (i.e. unloading). Again, this is generally due to the load beam assembly 502 engaging the load/unload ramp 78. Moreover, a free end 597 of the load beam 582 generally interfaces with the load/unload ramp 78 of the disk drive 10 to impose a lifting force in the direction indicated by arrow 598 (FIG. 9) on the load beam 582 during unloading. This free end 597 of the load beam 582 of FIG. 9 is equipped with a lift tab 590 which interfaces with the load/unload ramp 78 of the disk drive 10 to impose a lifting force on the load beam 582 during unloading. In addition, the load beam 582 has a leading edge limiter 592 positioned between and generally laterally spaced from the distal end 585 of the first flexure apparatus 540 and the slider body 508. This leading edge limiter 592 of the load beam 582 is generally equipped a flange 593 to engage and lift a lip 594 (FIGS. 7–8) of the first flexure apparatus 540, which, in turn, may effect a lifting force (also generally in the direction of the arrow 598) on the slider assembly 504 during unloading.

Operation of the disk drive 10 that contains the vent assembly 500 generally includes "flying" the slider assembly 504 above the data storage disk 18 utilizing both a negative pressure component formed within a first region that acts on a first portion of the slider assembly 504 and a positive pressure component that acts on a second portion of the. slider 42. Generally, during this flying step, the first valve 526 of the valve assembly 503 is generally in the closed position illustrated in FIG. 8. In addition, disk drive operations include parking the slider assembly 504 in spaced relation to the data storage disk 18 (e.g., such as on the load/unload ramp 78). The "parking" of the slider assembly 504 generally includes relieving the negative pressure within the first region in no more than about 1 $\mu$s of starting the parking step. A speed of pressure equalization can be calculated using simple gas dynamics, which state that with a pressure ratio of 2 across the first venting hole 524, sonic speed is almost reached and ultimately limits throughput. At 80% sonic speed of 260 m/s, the volume flow into the first venting hole 524 is $6.3 \times 10^3$ mm$^3$/s. The volume of the suction cavity 522 to be filled is generally about $1.65 \times 10^{-3}$ mm$^3$. Ignoring exponential behavior due to pressure ratio reduction, the time duration between effectively removing the first valve 526 from the first opening 528. of the first venting hole 524 and the substantial dissipation of the negative pressure component in the suction cavity 522 is about 1 $\mu$s. This negative pressure typically has an absolute value of up to about 50 kPa (0.49 atm or 7.25 psi) prior to the parking step. Due to the use of this vent assembly 500 having the first venting hole 524, the negative pressure generated with the suction cavity 522 of the slider assembly 504 generally does not increase by more than about 1% at any point during the parking step (compared with up to about 25% or more using a slider assembly without a venting hole 524).

Utilizing this negative pressure hole 524 in sliders (e.g., 42) during unloading not only reduces the footprint of the slider, it has several other benefits. With conventional designs, the most significant force load on a lift tab of a conventional load beam on a convention load/unload ramp is generally the sum of the gram load (typically about 1.8 g when the ramp is engaged) and the negative pressure component of the slider (typically about 1.9 g when the ramp is engaged). Alleviating this negative pressure component by utilizing the vent assembly 500 can result in a 50% force reduction of the impact of the lift tab 590 against the surface of the load/unload ramp 78. Thus, the reduction in friction between the lift tab 590 and the ramp may potentially reduce wear on the ramp 78. In addition, this potential reduction in impact force would inevitably facilitate required power-off unloads, especially in 2.5-inch disk drives, where much less voltage is available from the spindle motor 24 than with 3.5-inch disk drives. As another benefit, since the footprint of the vent assembly 500 is reduced, magnetic information can be exchanged with data tracks of the data storage disk 18 at least within a range of about 0 mils to about 3 mils from a peripheral edge of potential data storage area of the data storage disk 18. Thus, more of the data storage disk 18 may be utilized to store data.

Figure 10:
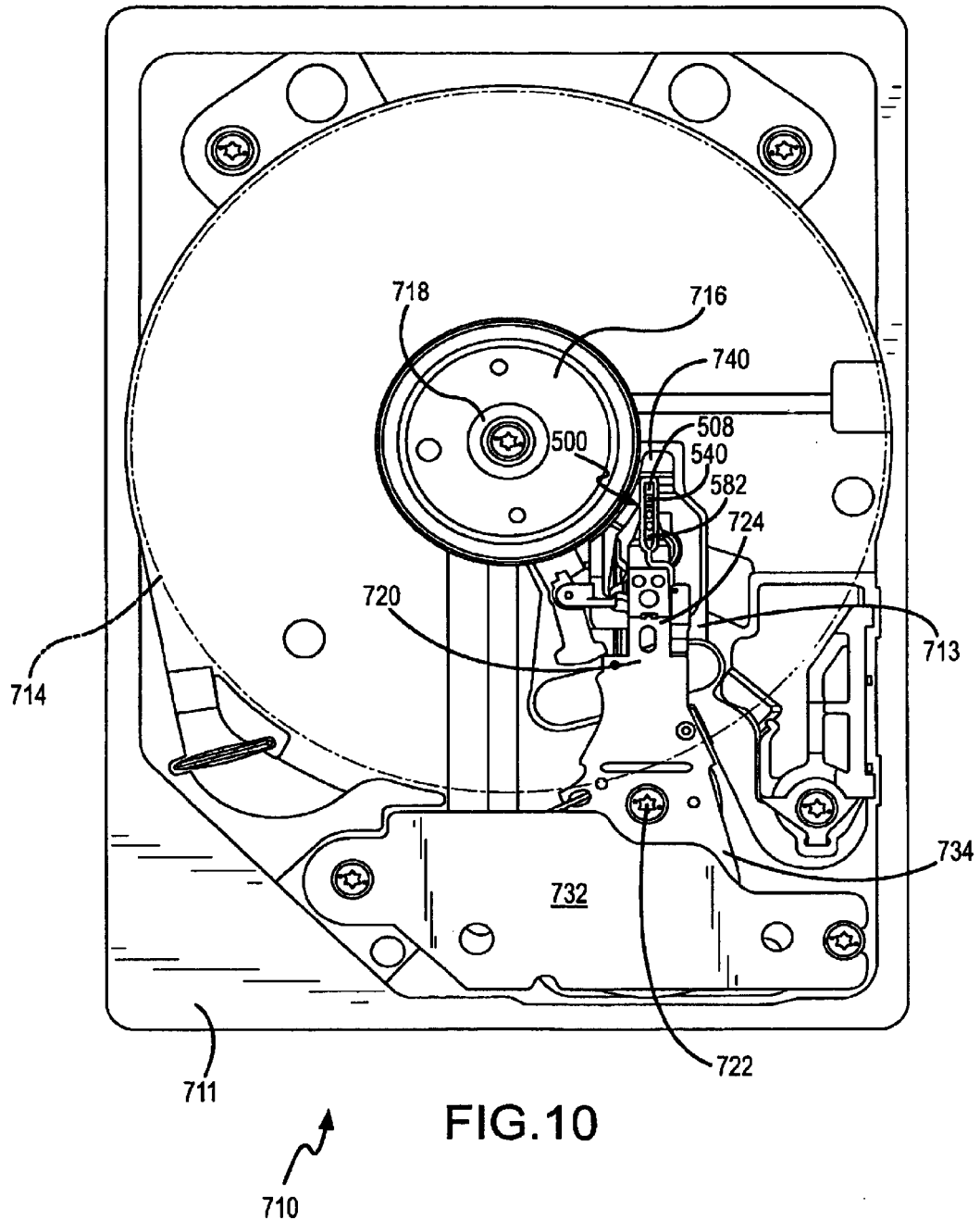
FIG. 10 is a top view of another embodiment of a disk drive having a load ramp disposed near a spindle of the disk drive.

FIGS. 10–11B illustrate another embodiment of a disk drive 710 that includes the vent assembly 500. The disk drive 710 generally includes a base plate 711 having a first surface 713. A cover (not shown) is typically disposed atop the base plate 711 and is detachably attached thereto to define an enclosed space for the various disk drive components. The disk drive 710 further includes a data storage disk 714 of any appropriate computer-readable data storage media. However, the data storage disk 714 of disk drive 710 has been removed to show various other disk drive components; accordingly, the data storage disk 714 is shown in dashed outline only in FIG. 10, and is not illustrated in FIGS. 11A–B.

The disk drive 710 also includes an actuator arm assembly 720 which pivots about a pivot bearing 722, which in turn is rotatably supported by the base plate 711 of the disk drive 710 and/or cover. FIGS. 10–11B illustrate that the actuator arm assembly 720 is positioned between the base plate 711 and the data storage disk 714 (i.e., under the data storage disk 714). This actuator arm assembly 720 generally includes a rigid actuator arm 724 which extends out from near the pivot bearing 722 and the vent assembly 500 of FIGS. 6–9. More specifically, an end 596 of the load beam 582 found opposite the lift tab 590 is generally attached to the actuator arm 724 and positioned at or near an end of the actuator arm 724 most remote from the pivot bearing 722.

As illustrated in FIGS. 10–11B, the vent assembly 500 is oriented such that the lower surface 520 of the slider body 508 and the bottom surface 584 of the load beam 582 at least generally face the data storage disk 714. In other words, the vent assembly 500 is positioned in a manner characterized by the lower surface 520 of the slider body 508 and the bottom surface 584 of the load beam assembly 582 at least generally facing in an "upward" direction of sorts. That is, the vent assembly 500 is oriented so that the lower surface 520 of the slider body 508 generally faces away from the base plate 711 and toward the cover (not shown) of the disk drive 710. Accordingly, the disk drive 710 also includes a load/unload ramp assembly 740 having a load/unload ramp 744 which slopes away from the data storage disk 714 and toward the base plate 711 of the disk drive 710 so as to dispose the slider body 508 of the vent assembly 500 and its corresponding data storage disk 714 in spaced relation when the vent assembly 500 is in a "parked" position (i.e., at the termination of disk drive operations) had shown in FIG. 11B. In the illustrated embodiment, the load/unload ramp assembly 740 is disposed "under" the data storage disk 714 (i.e., generally between the data storage disk 714 and the base plate 711) and at least generally toward a radially inward portion thereof. Moreover, the load/unload ramp assembly 740 is positioned near a spindle 716 of the disk drive 710. As a contrast to FIG. 11B, FIG. 11A shows the vent assembly 500 in an "operating" position, wherein the slider body 508 is separated from an operating surface of the data storage disk 714 by a distance that enables data to be exchanged between the slider body 508 and the data storage disk 714.

It is worth mentioning that a voice coil motor (VCM) 732 of the disk drive 710 at least operatively interfaces with the actuator arm assembly 720 at an end 734 that is most remote from the slider body 508 of the vent assembly 500. As with the VCM 32 of the disk drive 10 of FIG. 1, this VCM 732 generally imparts motion to the actuator arm assembly 720, and thus to the slider assembly 504 (e.g. in response to a control signal). The VCM 732 generally consists of a magnet(s) and a coil of fine wire, although other configurations are contemplated.

Operation of the disk drive 710 that contains the vent assembly 500 generally includes "flying" the slider assembly 504 above the data storage disk 714 utilizing both a negative pressure component formed within the suction cavity 522 of the slider body 508 and a positive pressure component that acts on the slider body 508. In addition, disk drive operations include parking the slider assembly 504 in spaced relation to the data storage disk 714 (e.g., such as on the load/unload ramp 744). The "parking" of the slider assembly 504 generally includes relieving the negative pressure within the suction cavity 522 of the slider body 508 in no more than about 1 µs of starting the parking step. A speed of pressure equalization can be calculated using simple gas dynamics, which state that with a pressure ratio of 2 across the first venting hole 524, sonic speed is almost reached and ultimately limits throughput. For example, at 80% sonic speed of 260 m/s, the volume flow into the first venting hole 524 is 6.3×10³ mm³/s. The volume of the suction cavity (e.g., 224, 272, 295) under the slider body 508 to be filled is about 1.65×10⁻³ mm³. Continuing with the example and ignoring exponential behavior due to pressure ratio reduction, the time duration between removing the first valve 526 from the first opening 528 of the first venting hole 524 and the substantial dissipation of the negative pressure component in the suction cavity (e.g., 224, 272, 295) of the disk drive of FIGS. 10–11B is generally about 1 µs. This negative pressure may have an absolute value of up to about 50 kPa (0.49 atm or 7.25 psi) prior to the parking step. Due to the use of this vent assembly 500 having the first venting hole 524, the negative pressure generated with the suction cavity 522 of the slider assembly 504 generally does not increase by more than about 1% at any point during the parking step.

Utilizing this negative pressure hole 524 in the slider body 508 of the slider assembly 504 during unloading not only reduces the footprint of the slider assembly 504, but also has several other potential benefits. With conventional designs, the most significant force load of a lift tab of a conventional load beam on a convention load/unload ramp is generally the sum of the gram load (typically 1.8 g when the ramp is engaged) and the negative pressure component of the slider (typically 1.9 g when the ramp is engaged). Alleviating this negative pressure component by utilizing the vent assembly 500 can result in a 50% force reduction of the impact of the lift tab 590 against the surface of the load/unload ramp 744. Thus, the reduction in friction between the lift tab 590 and the ramp 744 may potentially reduce wear on the ramp 744. In addition, this potential reduction in impact force may inevitably facilitate required power-off unloads, especially in 2.5-inch disk drives, where much less voltage is available from the spindle motor 24 than with 3.5-inch disk drives. As another benefit of utilizing the vent assembly 500, magnetic information can be exchanged with data tracks of the data storage disk 714 at least within a range of about 0 mils to about 3 mils from a peripheral edge of potential data storage area of the data storage disk 714. Thus, more of the data storage disk 714 may be utilized to store data.

Figure 12:
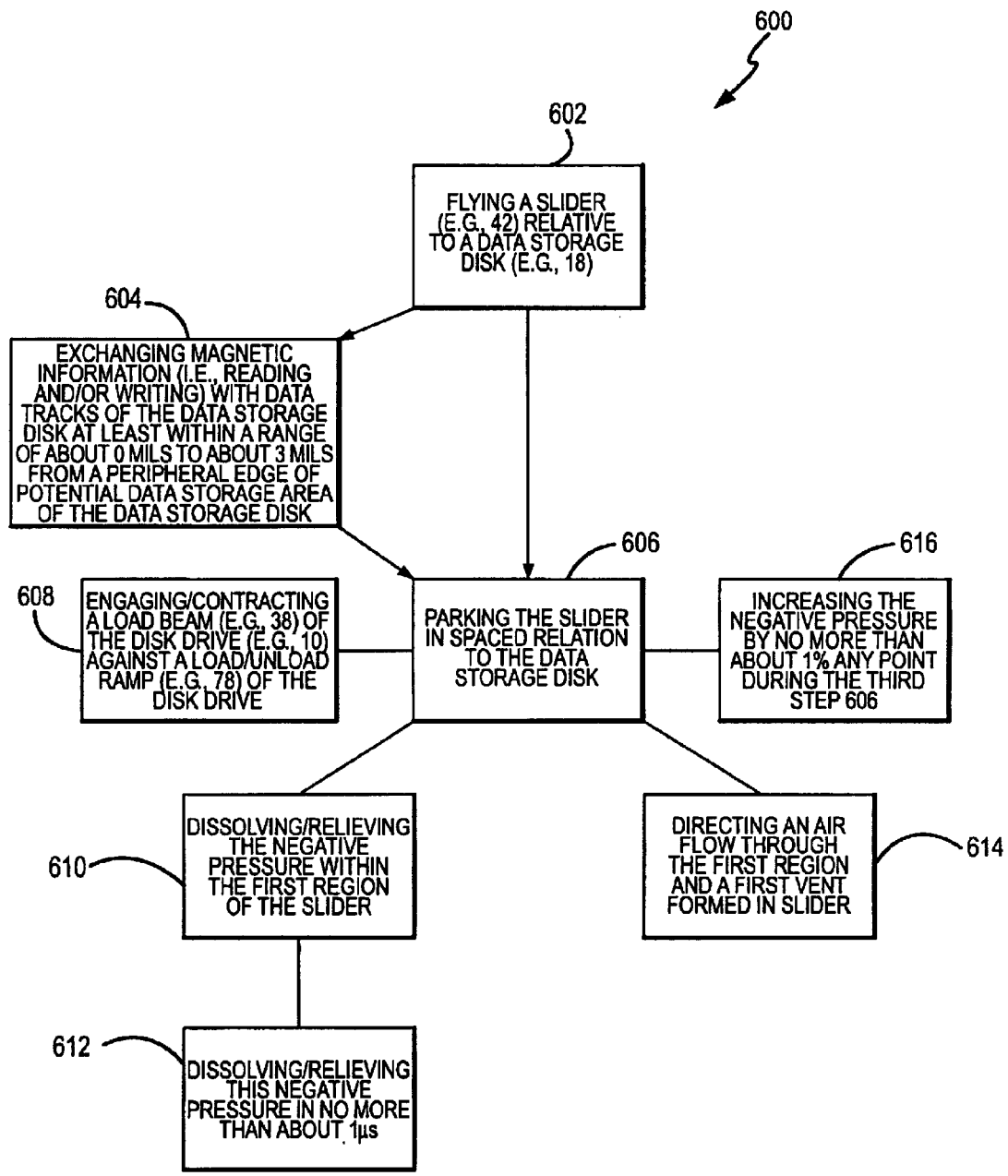
FIG. 12 is a flowchart of one embodiment of a protocol for operating a disk drive and that includes desirably addressing the negative pressure for/during parking.

FIG. 12 diagrammatically illustrates a protocol 600 for operating a disk drive (e.g., 10 and/or 710). This protocol generally includes a first step 602 of flying a slider (e.g., 42) relative to a data storage disk (e.g., 18). This first step 602 may generally entail spinning/rotation of the data storage disk (which, in turn, generally causes air movement) and positioning of the slider into operational interface with the data storage disk (i.e., a bottom surface of the slider may be located over a data storage surface of the data storage disk). In addition, this first step 602 may entail generating a negative pressure within a first region that acts on a first portion of the slider, and generating a positive pressure that acts on a second portion of the slider. An optional second step 604 of the protocol 600 may include exchanging magnetic information (i.e., reading and/or writing) with data tracks of the data storage disk at least within a range of about 0 mils to about 3 mils from a peripheral edge of potential data storage area of the data storage disk (i.e., within about 3 mils from an outer circumference of the data storage disk). A third step 606 of the protocol 600 generally includes parking the slider in spaced relation to the data storage disk. In other words, in this third step 606, the slider is disengaged from the operationally interfacing relationship indicative of the first step 602 of the protocol 600. Stated yet another way, the third step 606 may include repositioning of the slider so that (at least effectively) the bottom surface of the slider is no longer located over the data storage surface of the data storage disk.

Still referring to FIG. 12, a variety of optional sub-steps 608–616 may be included in the third step (i.e., parking step) 606 of the protocol 600. These sub-steps may be included in the protocol in substantially any combination. For instance, the third step 606 may include a first sub-step 608 of engaging/contacting a load beam (e.g., 38) of the disk drive (e.g., 10) against a load/unload ramp (e.g., 78) of the disk drive. As another option, the third step 606 may include a second sub-step 610 of dissolving/relieving the negative pressure within the first region of the slider. A third optional sub-step .612 generally includes dissolving/relieving this negative pressure in no more than about 1 μs. As yet another option, a fourth sub-step 614 may include directing an air flow through the first region and a first vent formed in slider. For example, the first region may correspond to a suction cavity (e.g., 224), and the first vent may correspond to a venting hole (e.g., 524). As even yet another option, the third step 606 may include an optional fifth sub-step 616 of increasing the negative pressure by no more than about 1% any point during the third step 606 of the protocol 600.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be. understood that the invention is adapted to numerous rearrangements, modifications, and alterations, and all such arrangements, modifications, and alterations are intended to be within the scope of the appended claims.

What is claimed is:

1. A load/unload-type disk drive comprising:
   a data storage medium;
   a slider comprising:
      a slider body comprising an upper surface and a lower surface that projects toward said data storage medium of said disk drive, wherein said lower surface comprises at least one air bearing surface, a suction cavity, a leading edge and a trailing edge longitudinally spaced from said leading edge, wherein said data storage medium moves relative to said slider body in a direction at least from said leading edge of said slider body toward said trailing edge of said slider body; and
      a first venting hole extending through said slider body to said suction cavity;
   a first valve associated with said first venting hole of said slider body; and
   a load beam, wherein said load beam comprises a top surface and a bottom surface generally facing said data storage medium of said disk drive, wherein said first valve is disposed between said bottom surface of said load beam and said upper surface of said slider body.

2. A disk drive, as claimed in claim 1, wherein said first venting hole of said slider body extends from said upper surface to said lower surface of said slider body.

3. A disk drive, as claimed in claim 1, wherein said first venting hole of said slider body comprises a diameter of less than about 1.0 mm.

4. A disk drive, as claimed in claim 1, wherein said first venting hole of said slider body comprises a diameter ranging from 0.1 mm up to 0.3 mm.

5. A disk drive, as claimed in claim 1, wherein said first venting hole of said slider body comprises a diameter ranging from ⅓ to ⅔ of a thickness of said slider body, wherein said thickness of said slider body refers to a distance between said upper surface and said lower surface of said slider body.

6. A disk drive, as claimed in claim 1, wherein said first valve is movable between first and second positions, wherein said first valve at least substantially seals said first venting hole when in said first position, and wherein said first valve is spaced from said first venting hole when in said second position.

7. A disk drive, as claimed in claim 1, wherein an opening of said first venting hole of said slider body defined by said lower surface of said slider body is unobstructed and completely exposed to said data storage medium.

8. A disk drive, as claimed in claim 1, wherein a thickness of said first valve is about 20 μm.

9. A disk drive, as claimed in claim 1, wherein said first valve comprises a modulus elasticity of about 200 GPa ($2.0 \times 10^{11}$ N/m$^2$).

10. A disk drive, as claimed in claim 1, wherein a bottom surface of said first valve is spaced from said upper surface of said slider body when said first valve is in an open position.

11. A disk drive, as claimed in claim 10, wherein said bottom surface of said first valve is spaced from said upper surface of said slider body by a distance of about 1.0 mil (25.4 μm) when said first valve is in said open position.

12. A disk drive, as claimed in claim 1, wherein a bottom surface of said first valve is in contact with said upper surface of said slider body when said first valve is in a closed position thus effectively occluding said first venting hole.

13. A disk drive, as claimed in claim 1, wherein a first gasket is positioned on a bottom surface of said first valve to interface with said upper surface of said slider body when said first valve is in a closed position thus effectively occluding said first venting hole.

14. A disk drive, as claimed in claim 13, wherein said first gasket comprises a first diameter, wherein said first venting hole comprises a second diameter, and wherein said first diameter is greater than said second diameter.

15. A disk drive, as claimed in claim 13, wherein said first gasket is made of a material selected from the group consisting essentially of polyimid, thermoplastics, elastomers, rubbers, and combinations thereof.

16. A disk drive, as claimed in claim 1, wherein said first valve comprises a first length of about 0.4 mm.

17. A disk drive, as claimed in claim 1, wherein said first valve comprises a first length of up to about 40% of a body length of said slider body, wherein said body length of said slider body refers to a distance between said leading and trailing edges of said slider body.

18. A disk drive, as claimed in claim 1, wherein said first valve comprises a shaft and a head, and wherein said shaft is narrower than said head.

19. A disk drive, as claimed in claim 18, wherein said shaft of said first valve comprises a width of about 0.2 mm.

20. A disk drive, as claimed in claim 18, wherein said shaft of said first valve comprises a width of up to about 30% of a body width of said slider body, wherein said body width of said slider body refers to a distance between first and second sides of said slider body.

21. A disk drive, as claimed in claim 1, wherein said slider body comprises a plurality of venting holes, and wherein said slider body comprises a plurality of valves equal in number to said plurality of venting holes.

22. A disk drive, as claimed in claim 1, wherein said suction cavity is positioned between said at least one air bearing surface and said trailing edge of said slider body.

23. A disk drive, as claimed in claim 1, wherein said suction cavity is positioned between said at least one air bearing surface and said leading edge of said slider body.

24. A disk drive, as claimed in claim 1, wherein said at least one air bearing surface comprises first and second air bearing surfaces, and wherein said suction cavity is positioned between said first air bearing surface and said second air bearing surface.

25. A disk drive, as claimed in claim 24, wherein said first air bearing surface is longitudinally spaced from said second air bearing surface.

26. A disk drive, as claimed in claim 24, wherein said first air bearing surface is laterally spaced from said second air bearing surface.

27. A disk drive, as claimed in claim 1, wherein a protrusion of said load beam interfaces with said first valve to bias said slider body toward said data storage medium.

28. A disk drive, as claimed in claim 27, wherein, in an operating position of said disk drive, said protrusion of said load beam is disposed against said first valve such that said first valve substantially seals an upper opening of said first venting hole, wherein said upper opening is defined by said upper surface of said slider body.

29. A disk drive, as claimed in claim 27, wherein, in an unloading position of said disk drive, said protrusion of said load beam is spaced from said first valve such that an air flow passage exists between an upper opening of said venting hole and said first valve, wherein said upper opening is defined by said upper surface of said slider body.

30. A disk drive, as claimed in claim 1, further comprising a load/unload ramp, wherein said load beam is designed to interface with said load/unload ramp of said disk drive to impose a lifting force on said load beam during unloading.

31. A disk drive, as claimed in claim 30, wherein said load beam comprises a lift tab designed to interface with said load/unload ramp of said disk drive to impose said lifting force on said load beam during unloading.

32. A disk drive, as claimed in claim 1, wherein said first valve is a component of a valve assembly that is affixed to said upper surface of said slider body, wherein said first valve is positioned over said first venting hole to at least assist in control of airflow through said first venting hole.

33. A disk drive, as claimed in claim 32, wherein said valve assembly is affixed to said slider body using adhesive.

34. A disk drive, as claimed in claim 32, wherein said first valve comprises a first thickness and a remainder of said valve assembly comprises a second thickness, wherein said second thickness is greater than said first thickness.

35. A disk drive, as claimed in claim 32, wherein said first valve comprises an attachment end, wherein said first valve is connected to said valve assembly via said attachment end.

36. A disk drive, as claimed in claim 35, wherein said first valve is a cantilever.

37. A disk drive, as claimed in claim 35, wherein, except for said attachment end, said first valve is spaced from a remainder of said valve assembly.

38. A disk drive, as claimed in claim 32, wherein said valve assembly is made from stainless steel.

39. A disk drive, as claimed in claim 32, wherein said load beam comprises a leading edge limiter to engage and lift a lip of said valve assembly.

40. A method of operating a disk drive, comprising the steps of:
 flying a slider relative to a data storage disk, wherein said flying step comprises the steps of generating a negative pressure within a first region that acts on a first portion of said slider and generating a positive pressure that acts on a second portion of said slider; and
 parking said slider in spaced relation to said data storage disk, wherein said parking step comprises relieving said negative pressure in no more than about 1 μs of starting said parking step, wherein said parking step comprises increasing said negative pressure by no more than about 1% at any point during said parking step.

41. A method, as claimed in claim 40, wherein said parking step comprises contacting a load beam of said disk drive against a load/unload ramp of said disk drive.

42. A method, as claimed in claim 40, wherein said parking step comprises directing an airflow through said first region and a first vent formed in said slider.

43. A method, as claimed in claim 40, further comprising the step of exchanging magnetic information with data tracks of said data storage disk at least within a range of 0 mils to 3 mils from a peripheral edge of potential data storage area of said data storage disk.

44. A method, as claimed in claim 40, wherein said negative pressure comprises an absolute value of 40 kPa (0.39 atm or 5.80 psi) to 50 kPa (0.49 atm or 7.25 psi) prior to said parking step.

45. A method of operating a disk drive, comprising the steps of:
 flying a slider relative to a data storage disk, wherein said flying step comprises the steps of generating a negative pressure within a first region that acts on a first portion of said slider and generating a positive pressure that acts on a second portion of said slider; and
 parking said slider in spaced relation to said data storage disk, wherein said parking step comprises directing an airflow through said first region and a first vent formed in said slider, wherein said parking step comprises increasing said negative pressure by no more than about 1% at any point during said parking step.

46. A method, as claimed in claim 45, wherein said directing step of said parking step comprises dissolving said negative pressure within said first region of said slider.

47. A method, as claimed in claim 46, wherein said dissolving step of said directing step of said parking step comprises relieving said negative pressure in no more than about 1 μs of starting said parking step.

48. A method, as claimed in claim 45, wherein said parking step comprises contacting a load beam of said disk drive against a load/unload ramp of said disk drive.

49. A method, as claimed in claim 45, further comprising the step of exchanging magnetic information with data tracks of said data storage disk at least within a range of 0 mils to 3 mils from a peripheral edge of potential data storage area of said data storage disk.

50. A method of operating a disk drive, comprising the steps of:
 flying a slider relative to a data storage disk, wherein said flying step comprises the steps of generating a negative pressure within a first region that acts on a first portion of said slider and generating a positive pressure that acts on a second portion of said slider;

exchanging magnetic information with data tracks of said data storage disk at least within a range of 0 mils to 3 mils from a peripheral edge of potential data storage area of said data storage disk; and parking said slider in spaced relation to said data storage disk, wherein said parking step comprises increasing said negative pressure by no more than about 1% at any point during said parking step.

51. A method, as claimed in claim 50, wherein said parking step comprises engaging a load beam of said disk drive with a load/unload ramp of said disk drive.

52. A method of operating a disk drive, comprising the steps of:

flying a slider relative to a data storage disk, wherein said flying step comprises the steps of generating a negative pressure within a first region that acts on a first portion of said slider and generating a positive pressure that acts on a second portion of said slider; and parking said slider in spaced relation to said data storage disk, wherein said parking step comprises contacting a load beam of said disk drive with a load/unload ramp of said disk drive, wherein said negative pressure substantially dissipates upon said contacting step, and wherein said negative pressure increases by no more than about 1% at any point during said parking step.

53. A load/unload-type disk drive comprising:

a data storage medium;

a slider comprising:

a slider body comprising an upper surface and a lower surface that projects toward said data storage medium of said disk drive, wherein said lower surface comprises at least one air bearing surface, a suction cavity, a leading edge and a trailing edge longitudinally spaced from said leading edge, wherein said data storage medium moves relative to said slider body in a direction at least from said leading edge of said slider body toward said trailing edge of said slider body; and a first venting hole extending through said slider body to said suction cavity; and a first valve associated with said first venting hole of said slider body, wherein said first venting hole of said slider body comprises a diameter ranging from ⅓ to ⅔ of a thickness of said slider body, wherein said thickness of said slider body refers to a distance between said upper surface and said lower surface of said slider body.

54. A load/unload-type disk drive comprising:

a data storage medium;

a slider comprising:

a slider body comprising an upper surface and a lower surface that projects toward said data storage medium of said disk drive, wherein said lower surface comprises at least one air bearing surface, a suction cavity, a leading edge and a trailing edge longitudinally spaced from said leading edge, wherein said data storage medium moves relative to said slider body in a direction at least from said leading edge of said slider body toward said trailing edge of said slider body; and a first venting hole extending through said slider body to said suction cavity; and a first valve associated with said first venting hole of said slider body, wherein said first valve comprises a modulus elasticity of about 200 GPa ($2.0 \times 10^{11}$ N/m$^2$).

55. A load/unload-type disk drive comprising:

a data storage medium;

a slider comprising:

a slider body comprising an upper surface and a lower surface that projects toward said data storage medium of said disk drive, wherein said lower surface comprises at least one air bearing surface, a suction cavity, a leading edge and a trailing edge longitudinally spaced from said leading edge, wherein said data storage medium moves relative to said slider body in a direction at least from said leading edge of said slider body toward said trailing edge of said slider body; and a first venting hole extending through said slider body to said suction cavity; and a first valve associated with said first venting hole of said slider body, wherein a bottom surface of said first valve is spaced from said upper surface of said slider body when said first valve is in an open position, and wherein said bottom surface of said first valve is spaced from said upper surface of said slider body by a distance of about 1.0 mil (25.4 $\mu$m) when said first valve is in said open position.

56. A load/unload-type disk drive comprising:

a data storage medium;

a slider comprising:

a slider body comprising an upper surface and a lower surface that projects toward said data storage medium of said disk drive, wherein said lower surface comprises at least one air bearing surface, a suction cavity, a leading edge and a trailing edge longitudinally spaced from said leading edge, wherein said data storage medium moves relative to said slider body in a direction at least from said leading edge of said slider body toward said trailing edge of said slider body; and a first venting hole extending through said slider body to said suction cavity; and a first valve associated with said first venting hole of said slider body, wherein a first gasket is positioned on a bottom surface of said first valve to interface with said upper surface of said slider body when said first valve is in a closed position thus effectively occluding said first venting is hole, and wherein said first gasket is made of a material selected from the group consisting essentially of polyimid, thermoplastics, elastomers, rubbers, and combinations thereof.

57. A load/unload-type disk drive comprising:

a data storage medium;

a slider comprising:

a slider body comprising an upper surface and a lower surface that projects toward said data storage medium of said disk drive, wherein said lower surface comprises at least one air bearing surface, a suction cavity, a leading edge and a trailing edge longitudinally spaced from said leading edge, wherein said data storage medium moves relative to said slider body in a direction at least from said leading edge of said slider body toward said trailing edge of said slider body; and a first venting hole extending through said slider body to said suction cavity; and a first valve associated with said first venting hole of said slider body, wherein said first valve comprises a shaft and a head, and wherein said shaft is narrower than said head.

58. A disk drive, as claimed in claim 57, wherein said shaft of said first valve comprises a width of about 0.2 mm.

59. A disk drive, as claimed in claim 57, wherein said shaft of said first valve comprises a width of up to about 30% of a body width of said slider body, wherein said body width of said slider body refers to a distance between first and second sides of said slider body.

60. A method of operating a disk drive, comprising the steps of:
- flying a slider relative to a data storage disk, wherein said flying step comprises the steps of generating a negative pressure within a first region that acts on a first portion of said slider and generating a positive pressure that acts on a second portion of said slider; and
- parking said slider in spaced relation to said data storage disk, wherein said parking step comprises relieving said negative pressure in no more than about 1 μs of starting said parking step, wherein said negative pressure comprises an absolute value of 40 kPa (0.39 atm or 5.80 psi) to 50 kPa (0.49 atm or 7.25 psi) prior to said parking step.

61. A load/unload-type disk drive comprising:
- a data storage medium;
- a slider comprising:
  - a slider body comprising an upper surface and a lower surface that projects toward said data storage medium of said disk drive, wherein said lower surface comprises at least one air bearing surface, a suction cavity, a leading edge and a trailing edge longitudinally spaced from said leading edge, wherein said data storage medium moves relative to said slider body in a direction at least from said leading edge of said slider body toward said trailing edge of said slider body; and
  - a first venting hole extending through said slider body to said suction cavity;
- a load beam comprising a first portion; and
- a flexure mounted on said slider body, wherein said flexure is interconnected with said load beam, wherein said flexure comprises a deflectable first valve that is associated with said first venting hole of said slider body and that is located at an intermediate elevation between said first portion of said load beam and said slider body, wherein said first portion of said load beam is aligned with said first valve, and wherein said first portion of said load beam is engageable with said first valve.

62. A disk drive, as claimed in claim 61, wherein:
said first portion is a projection.

63. A disk drive, as claimed in claim 61, wherein:
in a first condition said first portion of said load beam is spaced from said first valve and said first valve is positioned to allow a flow through said first venting hole, and wherein in a second condition said first portion of said load beam engages said first valve to deflect said first valve so as to preclude a flow through said first venting hole.

* * * * *

UNITED STATES PATENT AND TRADEMARK OFFICE
CERTIFICATE OF CORRECTION

PATENT NO. : 6,985,333 B1
DATED : January 10, 2006
INVENTOR(S) : Hiller et al.

It is certified that error appears in the above-identified patent and that said Letters Patent is hereby corrected as shown below:

<u>Column 32,</u>
Line 42, delete "is" (first occurrence).

Signed and Sealed this

Fourth Day of April, 2006

JON W. DUDAS
*Director of the United States Patent and Trademark Office*